(12) United States Patent
Shinozaki et al.

(10) Patent No.: US 9,702,541 B2
(45) Date of Patent: Jul. 11, 2017

(54) SOLAR POWER SYSTEM

(71) Applicant: Mitsubishi Hitachi Power Systems, Ltd., Yokohama-shi, Kanagawa (JP)

(72) Inventors: Kohei Shinozaki, Kure (JP); Takahiro Marumoto, Kure (JP); Tetsuo Shikata, Tokyo (JP); Jun Kashima, Kure (JP); Satoshi Tadakuma, Kure (JP)

(73) Assignee: Mitsubishi Hitachi Power Systems, Ltd., Yokohama-shi (JP)

( * ) Notice: Subject to any disclaimer, the term of this patent is extended or adjusted under 35 U.S.C. 154(b) by 101 days.

(21) Appl. No.: 14/414,851

(22) PCT Filed: Jul. 17, 2013

(86) PCT No.: PCT/JP2013/069407
§ 371 (c)(1),
(2) Date: Jan. 14, 2015

(87) PCT Pub. No.: WO2014/014027
PCT Pub. Date: Jan. 23, 2014

(65) Prior Publication Data
US 2015/0167499 A1    Jun. 18, 2015

(30) Foreign Application Priority Data

Jul. 17, 2012    (JP) .................................. 2012-158934
Mar. 29, 2013    (JP) .................................. 2013-073516

(51) Int. Cl.
*F22B 1/00* (2006.01)
*F22G 5/00* (2006.01)
(Continued)

(52) U.S. Cl.
CPC .............. *F22B 1/006* (2013.01); *F01K 3/002* (2013.01); *F01K 3/06* (2013.01); *F01K 3/12* (2013.01);
(Continued)

(58) Field of Classification Search
CPC ....... Y02E 70/30; Y02E 60/14; Y02E 60/142; Y02E 60/145; F24J 2/34; F22B 1/006;
(Continued)

(56) References Cited

U.S. PATENT DOCUMENTS 2,933,885 A    4/1960   Benedek et al.
4,854,121 A *  8/1989   Arii ....................... F01K 23/108
                                                    122/7 R
(Continued)

FOREIGN PATENT DOCUMENTS

DE    10 2009 025 455 A1    1/2011
EP         2 454 523 A2      5/2012
(Continued)

OTHER PUBLICATIONS

International Search Report (PCT/ISA/210) dated Oct. 15, 2013, with English translation (six (6) pages).

*Primary Examiner* — Mark Laurenzi
*Assistant Examiner* — Xiaoting Hu
(74) *Attorney, Agent, or Firm* — Crowell & Moring, LLP

(57) ABSTRACT

Provided is an inexpensive and simple solar power system. A solar power system according to the present invention includes: a heat collection apparatus (2, 4); a steam turbine (5), a power generator (16); a superheated steam supply line which supplies the steam turbine with superheated steam generated by the heat collection apparatus; a water supply line which condenses the steam expelled from the steam turbine into water and supplies the condensed water to the heat collection apparatus; a heat storage device (8) which has a heat storage medium; a first line which branches from the superheated steam supply line and which supplies the heat storage device with the superheated steam flowing through the superheated steam supply line; a second line which branches from the water supply line and which supplies the heat storage device with the water flowing (Continued)

through the water supply line; and a third line which supplies the steam turbine with superheated steam generated by the heat storage device. The heat storage device stores the heat of the superheated steam which has flowed through the first line in the heat storage medium, and heats the water which has flowed through the second line with the heat storage medium to thereby generate the superheated steam.

2 Claims, 16 Drawing Sheets

(51) Int. Cl.
| | | |
|---|---|---|
| *F01K 3/12* | (2006.01) | |
| *F03G 6/06* | (2006.01) | |
| *F24J 2/34* | (2006.01) | |
| *F28D 20/00* | (2006.01) | |
| *F22B 1/02* | (2006.01) | |
| *F22G 5/12* | (2006.01) | |
| *F01K 3/06* | (2006.01) | |
| *F22B 1/18* | (2006.01) | |
| *F01K 3/00* | (2006.01) | |
| *F01K 15/00* | (2006.01) | |
| *F03G 6/00* | (2006.01) | |
| *F01K 3/26* | (2006.01) | |
| *F28D 20/02* | (2006.01) | |

(52) U.S. Cl.
CPC .............. *F01K 3/265* (2013.01); *F01K 15/00* (2013.01); *F03G 6/003* (2013.01); *F03G 6/065* (2013.01); *F22B 1/028* (2013.01); *F22B 1/18* (2013.01); *F22G 5/00* (2013.01); *F22G 5/12* (2013.01); *F24J 2/34* (2013.01); *F28D 20/00* (2013.01); *F28D 20/028* (2013.01); *F28D 2020/0047* (2013.01); *Y02E 10/46* (2013.01); *Y02E 60/142* (2013.01); *Y02E 70/30* (2013.01)

(58) Field of Classification Search
CPC .............. F22G 5/12–5/14; F22G 5/123; F03G 6/00–6/068; F28D 20/00–20/028
USPC .................... 122/487; 60/641.8–641.15, 659
See application file for complete search history.

(56) References Cited

U.S. PATENT DOCUMENTS

| | | | |
|---|---|---|---|
| 7,296,410 B2 | 11/2007 | Litwin | |
| 8,087,245 B2 | 1/2012 | Quero et al. | |
| 2012/0144831 A1 | 6/2012 | Feldhoff et al. | |
| 2012/0255300 A1* | 10/2012 | Birnbaum | F03G 6/065 60/641.8 |
| 2013/0285380 A1* | 10/2013 | Afremov | F24J 2/07 290/52 |
| 2014/0138952 A1* | 5/2014 | Marumoto | F03G 6/065 290/52 |

FOREIGN PATENT DOCUMENTS

| | | | |
|---|---|---|---|
| JP | 51-25642 | 3/1976 | |
| JP | 60-122865 A | 7/1985 | |
| JP | 60-162038 A | 8/1985 | |
| JP | 61-41891 A | 2/1986 | |
| JP | 2004-340093 A | 12/2004 | |
| JP | 2010-285926 A | 12/2010 | |
| JP | WO 2013002054 A1 * | 1/2013 | ............ F03G 6/065 |
| WO | WO 2010/145970 A2 | 12/2010 | |

* cited by examiner

SOLAR POWER SYSTEM

TECHNICAL FIELD

The present invention relates to a solar power system which can collect solar heat, generate steam with the heat, and drive a steam turbine with the steam to thereby generate electric power.

BACKGROUND ART

In the case where a solar power system is used to generate electric power, there may be a case where working fluid for driving a steam turbine cannot be heated sufficiently only by solar heat obtained at that time due to the variation or decrease of the amount of solar radiation. To solve this problem, in many examples, a heat storage device is incorporated in the solar power system and heat collected by a heat collection device is stored in advance in the heat storage device so that the stored heat can be extracted and used if necessary (Patent Literatures 1 to 4).

CITATION LIST

Patent Literature

Patent Literature 1: JP-A-60-122865
Patent Literature 2: U.S. Pat. No. 7,296,410
Patent Literature 3: U.S. Pat. No. 8,087,245
Patent Literature 4: JP-A-61-41891

SUMMARY OF INVENTION

Technical Problem

Here, from the viewpoints of cost reduction of the solar power system, reliability of the system and maintenance management, it is desirable that the number or kind of devices constituting the solar power system, such as heat collection devices and heat storage devices, is not increased but the configuration of the solar power system is made as simple as possible. With regard to this point, each of Patent Literatures 1 through 3 discloses an example in which a plurality of heat storage devices are installed. For this reason, there is a problem that equipment cost and construction cost of the solar power system may increase.

In addition, molten salt or oil circulates between a heat collection device and a steam superheating heat storage device in Patent Literature 1 or all over the system in Patent Literature 2. Therefore, an expensive pump high in performance is required so that equipment cost and running cost may also increase correspondingly.

In addition, in Patent Literature 3, a high temperature heat storage device and a low temperature heat storage device are used as temporary backups when the amount of solar radiation decreases. Therefore, for power generation at night, a tower type heat collection device must be bypassed and the system must be backed up by thermal power generation using a fossil fuel assist device. Therefore, there is a problem that fuel cost and $CO_2$ emission may increase.

In addition, in Patent Literature 4, a part of superheated steam generated by a superheater is supplied to a heat exchanger so that heat exchange can be performed between the part of the superheated steam and a heat storage medium in the heat exchanger. The part of the superheated steam whose heat has been released to the heat storage medium is reserved as saturated water in an accumulator. During heat release operation, the pressure of the saturated water reserved in the accumulator is reduced so that the saturated water can be evaporated continuously and the saturated steam generated thus can be supplied to the heat exchanger. The saturated steam supplied to the heat exchanger takes heat from the heat storage medium in the heat exchanger to be turned into superheated steam. The superheated steam is supplied to a steam turbine etc. through a steam supply pipe.

Thus, in Patent Literature 4, it is necessary to reserve a large amount of saturated water required for the heat release operation in the accumulator. For this reason, there is a problem that the volume of the accumulator may be excessively large to increase the installation space and equipment cost.

In addition, Patent Literature 4 has a problem that the pressure of the steam supplied to the steam turbine etc. through the steam supply pipe during the heat release operation may decrease greatly in comparison with that during normal operation. This is because when the superheated steam passes through the heat exchanger during the normal operation, pressure loss is generated to thereby result in the decrease of the pressure of the saturated water reserved in the accumulator. In addition, it is because when the saturated water reserved in the accumulator is evaporated to pass through the heat exchanger during the heat release operation, pressure loss is generated to thereby result in the decrease of the pressure of the superheated steam generated in the heat exchanger.

Therefore, there is a problem that, when superheated steam generated according to Patent Literature 4 is supplied to the steam turbine to generate electric power, power generation efficiency during the heat release operation may decrease greatly in comparison with that during the normal operation, with the result that energy loss may increase.

The invention has been accomplished in order to solve the foregoing problems. An object of the invention is to provide an inexpensive and simple solar power system. In addition, another object of the invention is to provide a solar power system whose power generation efficiency during heat release operation can be prevented from decreasing greatly in comparison with that during normal operation.

Solution to Problem

In order to achieve the aforementioned objects, according to a first configuration of the invention, there is provided a solar power system including: a heat collection apparatus which collects sunlight to heat water; a steam turbine; a power generator which generates electric power with motive power of the steam turbine; a superheated steam supply line which supplies the steam turbine with superheated steam generated by the heat collection apparatus; a water supply line which condenses the steam expelled from the steam turbine into water and supplies the condensed water to the heat collection apparatus; a heat storage device which has a heat storage medium; a first line which branches from the superheated steam supply line and which supplies the heat storage device with the superheated steam flowing through the superheated steam supply line; a second line which branches from the water supply line and which supplies the heat storage device with the water flowing through the water supply line; and a third line which supplies the steam turbine with superheated steam generated by the heat storage device; wherein: the heat storage device stores the heat of the superheated steam which has flowed through the first line in the heat storage medium, and heats the water which has flowed through the second line with the heat storage medium to generate superheated steam.

According to the first configuration, heat can be stored in the heat storage device by use of the heat of the superheated steam flowing through the superheated steam supply line. Accordingly, it is not necessary to separately provide a heat collection device between the second line and the third line through the heat storage device. Thus, the solar power system can be made inexpensive and simple. In addition, not only the superheated steam generated by the heat collection apparatus but also the superheated steam generated by the heat storage device can be supplied to the steam turbine. Accordingly, electric power can be generated stably in spite of the variation of the amount of solar radiation.

According to a second configuration of the invention, there is provided a solar power system in the first configuration, wherein: the heat collection apparatus includes a low temperature heat collection device which heats water to generate steam and a high temperature heat collection device which further heats the steam heated by the low temperature heat collection device to generate superheated steam; a steam-water separation device is provided between the low temperature heat collection device and the high temperature heat collection device; and a fourth line is provided to return water separated by the steam-water separation device to the water supply line.

According to the second configuration, only saturated steam can be delivered to the high temperature heat collection device by the steam-water separation device. Accordingly, for example, an inexpensive pump can be used to reduce the cost in comparison with the case where water-steam two-phase fluid is delivered to the high temperature heat collection device.

According to a third configuration of the invention, there is provided a solar power system in the second configuration, wherein: a fifth line is provided to supply the steam-water separation device with the steam which has flowed from the first line into the heat storage device and whose heat has been released to the heat storage medium in the heat storage device.

According to the third configuration, the steam which has flowed through the heat storage device is separated into water and saturated steam by the steam-water separation device and only the saturated steam is delivered to the high temperature heat collection device again. Accordingly, in addition to saturated steam delivered from the low temperature heat collection device, the saturated steam from the heat storage device is also delivered to the high temperature heat collection device. Therefore, the recovery amount of heat is increased and thermal efficiency is enhanced.

According to a fourth configuration of the invention, there is provided a solar power system in the third configuration, further including: a temperature detector which detects the temperature of the superheated steam flowing through the first line; a spray valve which adjusts the temperature of the superheated steam flowing through the first line; and a first control device which controls action of the spray valve; wherein: the first control device adjusts a valve opening degree of the spray valve based on a detection signal of the temperature detector so that the temperature of the superheated steam flowing through the first line can be kept lower than a temperature which can cause deterioration of the heat storage medium.

According to the fourth configuration, the valve opening degree of the spray valve is adjusted so that the temperature of the superheated steam flowing through the first line can be kept at a temperature lower than the temperature which can cause deterioration of the heat storage medium. Accordingly, the superheated steam can prevent deterioration of the heat storage medium packed in the heat storage device. Thus, maintenance cost of the system can be reduced.

According to a fifth configuration of the invention, there is provided a solar power system in the third configuration, further including: a water supply valve which is provided in the water supply line and which adjusts the flow rate of the water supplied to the low temperature heat collection device; a steam extraction valve which is provided in the first line and which adjusts the flow rate of the superheated steam supplied to the heat storage device; a water level detector which detects the level of the water separated by the steam-water separation device; a flow rate detector which detects the flow rate of the water supplied to the low temperature heat collection device; and a second control device which controls action of the water supply valve and action of the steam extraction valve; wherein: the second control device adjusts a valve opening degree of the water supply valve and a valve opening degree of the steam extraction valve based on a detection signal of the water level detector and a detection signal of the flow rate detector so that the temperature of the superheated steam flowing through the fifth line can be kept higher than a coagulation point of the heat storage medium.

According to the fifth configuration, the temperature of the superheated steam flowing through the fifth line can be kept higher than the coagulation point of the heat storage medium. Accordingly, the superheated steam flowing through the heat storage device can prevent the heat storage medium from coagulating. Thus, it is not necessary to install an agitator etc. for preventing coagulation of the heat storage medium so that the solar power system can made simpler and more inexpensive.

In addition, in order to achieve the aforementioned objects, according to a sixth configuration of the invention, there is provided a solar power system including: a low temperature heat collection device which collects sunlight to heat water to thereby generate steam; a high temperature heat collection device which collects sunlight to further heat the steam generated by the low temperature heat collection device to thereby generate superheated steam; a steam-water separation device which is provided between the low temperature heat collection device and the high temperature heat collection device; a steam turbine; a power generator which generates electric power with motive power of the steam turbine; a superheated steam supply line which supplies the steam turbine with the superheated steam generated by the high temperature heat collection device; a water supply line which condenses the steam expelled from the steam turbine into water and supplies the condensed water to the low temperature heat collection device; a high temperature heat storage device which has a second heat storage medium; a first line which branches from the superheated steam supply line and which supplies the high temperature heat storage device with the superheated steam flowing through the superheated steam supply line; a third line which supplies the steam turbine with superheated steam generated by the high temperature heat storage device; and a sixth line which supplies the high temperature heat storage device with steam separated by the steam-water separation device; wherein: the high temperature heat storage device stores the heat of the superheated steam which has flowed through the first line in the second heat storage medium, and heats the steam which has flowed through the sixth line with the second heat storage medium to thereby generate superheated steam.

According to the sixth configuration, heat can be stored in the high temperature heat storage device by use of the heat of the superheated steam flowing through the superheated steam supply line. Accordingly, it is not necessary to separately provide a heat collection device etc. for the high temperature heat storage device. Thus, the solar power system can be made inexpensive and simple. In addition, not only the superheated steam generated by the high temperature heat collection device but also the superheated steam generated by the high temperature heat storage device can be supplied to the steam turbine. Accordingly, electric power can be generated stably in spite of the variation of the amount of solar radiation. In addition, according to the sixth configuration, the pressure of the superheated steam supplied to the steam turbine is substantially unchanged between normal operation (heat storage operation) and heat release operation. Accordingly, power generation efficiency can be prevented from decreasing greatly due to the operation state.

According to a seventh configuration of the invention, there is provided a solar power system in the sixth configuration, wherein: a deaerator which reduces or removes dissolved oxygen in supplied water is installed in the water supply line, and a seventh line is provided to return, to the deaerator, the steam which has exchanged heat with the second heat storage medium in the high temperature heat storage device. According to the seventh configuration, water resources can be effectively used.

According to an eighth configuration of the invention, there is provided a solar power system in the seventh configuration, wherein: a heat storage operation mode and a heat release operation mode are provided as operation modes; operation in the heat storage operation mode is performed in such a manner that water is made to flow through the low temperature heat collection device, the steam-water separation device and the high temperature heat collection device sequentially to thereby generate superheated steam, and apart of the superheated steam is led into the high temperature heat storage device to store heat in the second heat storage medium and then returned to the deaerator via the seventh line while the residual part of the superheated steam is supplied to the steam turbine; and operation in the heat release operation mode is performed in such a manner that water is made to flow through the low temperature heat collection device and the steam-water separation device sequentially and supplied to the high temperature heat storage device via the sixth line to thereby generate superheated steam and the superheated steam is supplied to the steam turbine via the third line.

According to the eighth configuration, the superheated steam stable in pressure can be supplied to the steam turbine in the both modes, i.e. the heat storage operation mode and the heat release operation mode. Accordingly, electric power can be generated stably.

In addition, in order to achieve the aforementioned objects, according to a ninth configuration of the invention, there is provided a solar power system including: a heat collection apparatus which collects sunlight to heat water; a steam turbine; a power generator which generates electric power with motive power of the steam turbine; a superheated steam supply line which supplies the steam turbine with superheated steam generated by the heat collection apparatus; a water supply line which condenses the steam expelled from the steam turbine into water and supplies the condensed water to the heat collection apparatus; a low temperature heat storage device which has a first heat storage medium; a high temperature heat storage device which has a second heat storage medium; a sub steam-water separation device which is provided between the low temperature heat storage device and the high temperature heat storage device; a first line which branches from the superheated steam supply line and which supplies the high temperature heat storage device with the superheated steam flowing through the superheated steam supply line; an eighth line which supplies the low temperature heat storage device with the superheated steam which has been supplied from the first line to the high temperature heat storage device; a ninth line which returns, to the water supply line, the steam which has been supplied from the eighth line to the low temperature heat storage device; a second line which branches from the water supply line and which supplies the low temperature heat storage device with the water flowing through the water supply line; a tenth line which supplies steam generated by the low temperature heat storage device to the high temperature heat storage device via the sub steam-water separation device; and a third line which supplies the steam turbine with superheated steam generated by the high temperature heat storage device; wherein: the low temperature heat storage device stores the heat of the steam which has flowed through the eighth line in the first heat storage medium, and heats the water which has flowed through the second line with the first heat storage medium to thereby generate steam; and the high temperature heat storage device stores the heat of the superheated steam which has flowed through the first line in the second heat storage medium, and heats the steam which has flowed through the tenth line with the second heat storage medium to thereby generate superheated steam.

According to the ninth configuration, heat can be stored in the low temperature heat storage device and the high temperature heat storage device by use of the heat of the superheated steam flowing through the superheated steam supply line. Accordingly, it is not necessary to separately provide a heat collection device etc. for each of the heat storage devices. Thus, the solar power system can be made inexpensive and simple. Not only the superheated steam generated by the heat collection apparatus but also the superheated steam generated by the high temperature heat storage device can be supplied to the steam turbine. Accordingly, electric power can be generated stably in spite of the variation of the amount of solar radiation.

In addition, in the ninth configuration, the low temperature heat storage device and the high temperature heat storage device are provided. Accordingly, operation can be made, for example, in the following manner. In the daytime, superheated steam is generated by the heat collection apparatus so as to generate electric power. On the other hand, in the night time, the heat collection apparatus is stopped but superheated steam is generated by the low temperature heat storage device and the high temperature heat storage device so as to generate electric power. Thus, the operating rate of the solar power system can be enhanced. In addition, according to the ninth configuration, the pressure of the superheated steam supplied to the steam turbine is substantially unchanged between normal operation (heat storage operation) and heat release operation. Thus, power generation efficiency can be prevented from decreasing greatly due to the operating state.

According to a tenth configuration of the invention, there is provided a solar power system in the ninth configuration, wherein: an eleventh line is provided to return, to the water supply line, water separated by the sub steam-water separation device. According to the tenth configuration, water resources can be used effectively.

According to an eleventh configuration of the invention, there is provided a solar power system in the tenth configuration, wherein: the heat collection apparatus includes a low temperature heat collection device which heats water to generate steam and a high temperature heat collection device which further heats the steam generated by the low temperature heat collection device to generate superheated steam; a steam-water separation device is provided between the low temperature heat collection device and the high temperature heat collection device; and a fourth line is provided to return water separated by the steam-water separation device to the water supply line or to a device provided in the water supply line. According to the eleventh configuration, the heat collection apparatus can be made inexpensive and simple and water resources can be used effectively.

According to a twelfth configuration of the invention, there is provided a solar power system in the eleventh configuration, wherein: a heat storage operation mode and a heat release operation mode are provided as operation modes; operation in the heat storage operation mode is made in such a manner that water is made to flow through the low temperature heat collection device, the steam-water separation device and the high temperature heat collection device sequentially to thereby generate superheated steam, and a part of the superheated steam is led into the high temperature heat storage device and the low temperature heat storage device sequentially to store heat in the first heat storage medium and the second heat storage medium respectively and then returned to the water supply line via the ninth line while the residual part of the superheated steam is supplied to the steam turbine; and operation in the heat release operation mode is made in such a manner that water is made to flow through the low temperature heat storage device, the sub steam-water separation device and the high temperature heat storage device sequentially to thereby generate superheated steam, and the superheated steam is supplied to the steam turbine via the third line while water separated by the sub steam-water separation device is returned to the water supply line via the eleventh line.

According to the twelfth configuration, superheated steam stable in pressure can be supplied to the steam turbine in the both modes, i.e. the heat storage operation mode and the heat release operation mode. Accordingly, electric power can be generated stably.

According to a thirteenth configuration of the invention, there is provided a solar power system including: a low temperature heat collection device which collects sunlight to heat water to thereby generate steam; a high temperature heat collection device which collects sunlight to further heat the steam generated by the low temperature heat collection device to thereby generate superheated steam; a steam-water separation device which is provided between the low temperature heat collection device and the high temperature heat collection device; a steam turbine; a power generator which generates electric power with motive power of the steam turbine; a superheated steam supply line which supplies the steam turbine with the superheated steam generated by the high temperature heat collection device; a water supply line which condenses the steam expelled from the steam turbine into water and supplies the condensed water to the low temperature heat collection device; a low temperature heat storage device which has a first heat storage medium; a high temperature heat storage device which has a second heat storage medium; a sub steam-water separation device which is provided between the low temperature heat storage device and the high temperature heat storage device; a first line which branches from the superheated steam supply line and which supplies the high temperature heat storage device with the superheated steam flowing through the superheated steam supply line; an eighth line which supplies the low temperature heat storage device with the superheated steam which has been supplied from the first line to the high temperature heat storage device; a ninth line which returns, to the water supply line, the steam which has been supplied from the eighth line to the low temperature heat storage device; a second line which branches from the water supply line and which supplies the low temperature heat storage device with the water flowing through the water supply line; a tenth line which supplies steam generated by the low temperature heat storage device to the high temperature heat storage device via the sub steam-water separation device; a third line which supplies the steam turbine with superheated steam generated by the high temperature heat storage device; and a sixth line which supplies the high temperature heat storage device with steam separated by the steam-water separation device; wherein: the low temperature heat storage device stores the heat of the steam which has flowed through the eighth line in the first heat storage medium, and heats the water which has flowed through the second line with the first heat storage medium to thereby generate steam; and the high temperature heat storage device stores the heat of the superheated steam which has flowed through the first line in the second heat storage medium, and heats the steam which has flowed through the sixth line or the steam which has flowed through the tenth line with the second heat storage medium to thereby generate superheated steam.

According to the thirteenth configuration, heat can be stored in the low temperature heat storage device and the high temperature heat storage device by use of the heat of the superheated steam flowing through the superheated steam supply line. Accordingly, it is not necessary to separately provide a heat collection device etc. for each of the heat storage devices. Thus, the solar power system can be made inexpensive and simple. In addition, not only the superheated steam generated by the high temperature heat collection device but also the superheated steam generated by the high temperature heat storage device can be supplied to the steam turbine. Accordingly, electric power can be generated stably in spite of the variation of the amount of solar radiation.

In addition, in the thirteenth configuration, the low temperature heat storage device and the high temperature heat storage device are provided. Accordingly, operation can be made, for example, in the following manner. In the daytime, superheated steam is generated by the low temperature heat collection device and the high temperature heat collection device so as to generate electric power. On the other hand, in the nighttime, the low temperature heat collection device and the high temperature heat collection device are stopped but superheated steam is generated by the low temperature heat storage device and the high temperature heat storage device so as to generate electric power. In addition, operation may be also made in such a manner that steam is generated by the low temperature heat collection device and superheated steam is generated by the high temperature heat storage device. Thus, various operations can be achieved and the operating rate of the solar power system can be enhanced. In addition, according to the thirteenth configuration, the pressure of the superheated steam supplied to the steam turbine is substantially unchanged between normal operation (heat storage operation) and heat release operation. Thus, power generation efficiency can be prevented from decreasing greatly due to the operating state.

According to a fourteenth configuration of the invention, there is provided a solar power system in the thirteenth configuration, wherein: a fourth line is provided to return water separated by the steam-water separation device to the water supply line or to a device provided in the water supply line, and an eleventh line is provided to return water separated by the sub steam-water separation device to the water supply line. According to the fourteenth configuration, water resources can be used effectively.

According to a fifteenth configuration of the invention, there is provided a solar power system in the fourteenth configuration, wherein: a heat storage operation mode, a short-time heat release operation mode and a long-time heat release operation mode are provided as operation modes; operation in the heat storage operation mode is performed in such a manner that water is made to flow through the low temperature heat collection device, the steam-water separation device and the high temperature heat collection device sequentially to thereby generate superheated steam, and apart of the superheated steam is led into the high temperature heat storage device and the low temperature heat storage device sequentially to store heat in the first heat storage medium and the second heat storage medium respectively and then returned to the water supply line via the ninth line while the residual part of the superheated steam is supplied to the steam turbine; operation in the short-time heat release operation mode is performed in such a manner that water is made to flow through the low temperature heat collection device and the steam-water separation device sequentially and supplied to the high temperature heat storage device via the sixth line to thereby generate superheated steam, and the superheated steam is supplied to the steam turbine via the third line; and operation in the long-time heat release operation mode is performed in such a manner that water is made to flow through the low temperature heat storage device, the sub steam-water separation device and the high temperature heat storage device sequentially to thereby generate superheated steam, and the superheated steam is supplied to the steam turbine via the third line while water separated by the sub steam-water separation device is returned to the water supply line via the eleventh line.

According to the fifteenth configuration, superheated steam stable in pressure can be supplied to the steam turbine in all the modes, i.e. the heat storage operation mode, the short-time heat release operation mode and the long-time heat release operation mode. Accordingly, electric power can be generated stably.

According to a sixteenth configuration of the invention, there is provided a solar power system in any one of the sixth, ninth and thirteenth configurations, wherein: molten salt is used as the second heat storage medium packed in the high temperature heat storage device; a molten salt circulation line in which the molten salt is circulated by a medium circulation pump is provided in the high temperature heat storage device; and the flow rate of the medium circulation pump is controlled so that a heat storage amount and a heat release amount of the high temperature heat storage device can be adjusted desirably. The sixteenth configuration is preferable for preventing coagulation of the molten salt.

According to a seventeenth configuration of the invention, there is provided a solar power system in any one of the second, sixth, eleventh and thirteenth configurations, wherein: a Fresnel type or trough type light/heat collection device which is a linear light collection system is used as the low temperature heat collection device; and a tower type light/heat collection device which is a point light collection system is used as the high temperature heat collection device. The seventeenth configuration is more preferable for cost reduction and simplification of the solar power system.

ADVANTAGEOUS EFFECTS OF INVENTION

According to the invention, the aforementioned configuration is provided so that an inexpensive and simple solar power system can be constructed. In addition, a solar power system which can prevent power generation efficiency from decreasing greatly due to its operating state can be constructed. Incidentally, other problems, configurations and effects than the aforementioned ones will be made clear from the following description of embodiments.

DESCRIPTION OF EMBODIMENTS

The contents of the invention will be described in detail in undermentioned embodiments, but the invention is not limited to these embodiments.

First Embodiment

Figure 1:
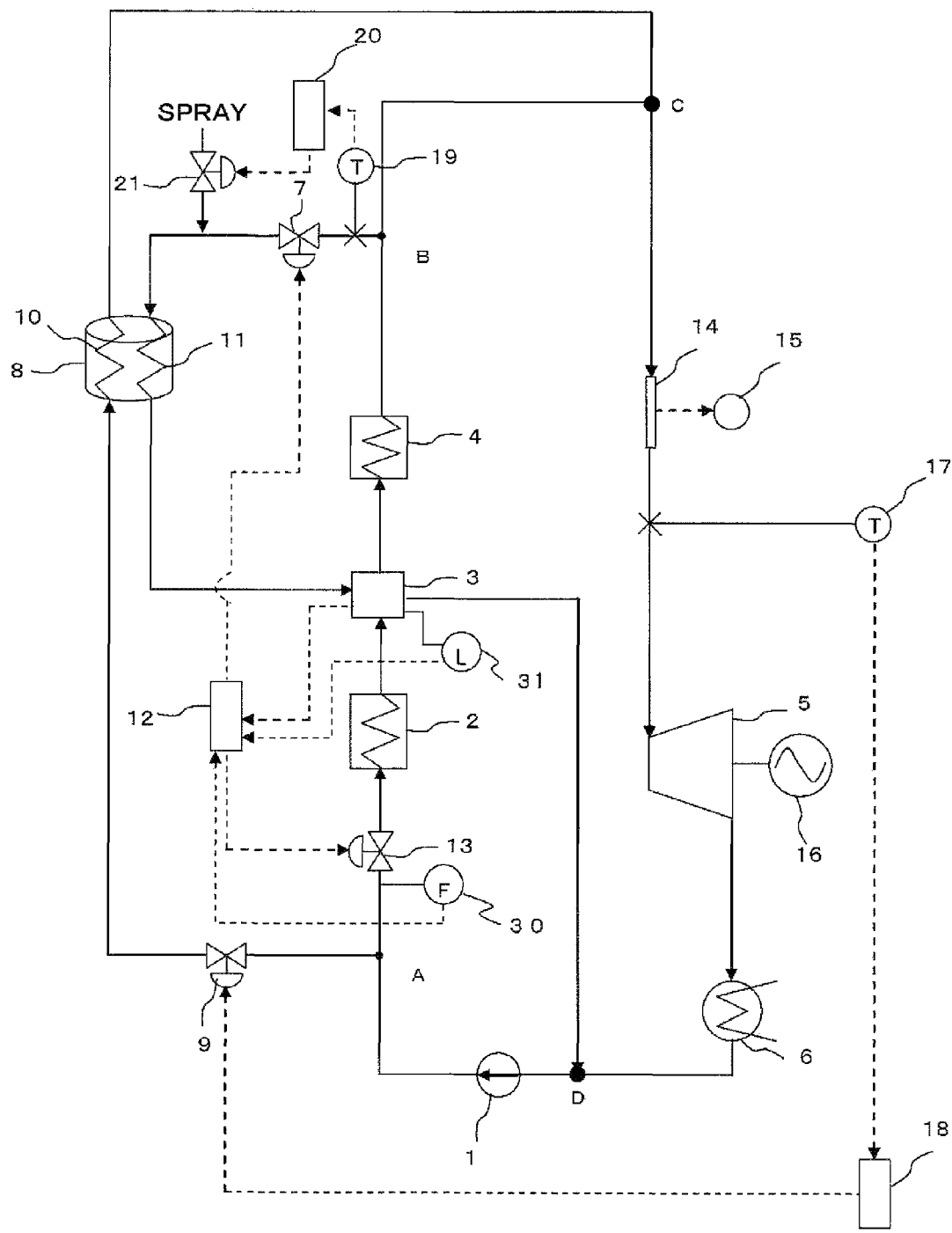
FIG. 1 A schematic view of the configuration of a solar power system according to a first embodiment of the invention.

FIG. 1 is a view of the configuration of a solar power system according to an embodiment of the invention. In the drawing, the reference numeral 1 designates a feedwater pump; 2, a low temperature heat collection device (heat collection apparatus) which collects sunlight to heat water; 3, a steam-water separation device; 4, a high temperature heat collection device (heat collection apparatus) which collects sunlight to heat steam; 5, a steam turbine; 6, a gland condenser; 7, a steam extraction valve; 8, a heat storage device; 9 and 13, water supply valves; 10, a water supply heat transfer pipe; 11, a superheated steam heat transfer pipe; 12, an arithmetic device (second control device); 14, a flowmeter; 15, a flow rate display panel; 16, a power generator; 17, a thermometer; 18, an arithmetic device; 19, a thermometer (temperature detector); 20, an arithmetic device (first control device); 21, a spray valve; 30, a flowmeter (flow rate detector) which measures the flow rate of water supplied from the water supply valve 13 to the low temperature heat collection device 2; and 31, a water level gauge (water level detector) which measures the water level of the steam-water separation device 3.

In the following description, pipes connecting respective constituent elements will be expressed as lines 0-0. Each of the aforementioned Os will be replaced by a reference numeral or sign. For example, a line 1-13 expresses a pipe connecting the feedwater pump 1 and the water supply valve 13. In addition, a line 8-C expresses a pipe connecting the heat storage device 8 and a branch point C.

In the solar power system, as shown in FIG. 1, water supplied from the feedwater pump 1 first passes through the line 1-13. The flow rate of the water is adjusted by the water supply valve 13. Then, the adjusted water is delivered to the low temperature heat collection device 2 through a line 13-2. In the low temperature heat collection device 2, the supplied water is heated by solar heat so that water-steam two-phase fluid can be generated. The generated water-steam two-phase fluid is delivered to the steam-water separation device 3 through a line 2-3.

The water-steam two-phase fluid generated by the low temperature heat collection device 2 is separated into water and steam by the steam-water separation device 3. The separated saturated steam is delivered to the high temperature heat collection device 4 through a line 3-4. The saturated steam led into the high temperature heat collection device 4 is further heated by solar heat so that superheated steam can be generated. Incidentally, the water separated by the steam-water separation device 3 is delivered to an inlet of the feedwater pump 1 through a line 3-1.

A part of the superheated steam generated by the high temperature heat collection device 4 is extracted to pass through a line 4-7. The flow rate of the extracted superheated steam is adjusted by the steam extraction valve 7. Then, the adjusted superheated steam is delivered to the heat storage device 8 through a line 7-11. In the process of flowing through the superheated steam heat transfer pipe 11 inside the heat storage device 8, the superheated steam serving as a heat transfer medium exchanges thermal energy with a heat storage medium packed in the heat storage device 8. The superheated steam which has exchanged heat with the heat storage medium turns into water-steam two-phase fluid, which then flows out from an outlet of the superheated steam heat transfer pipe 11. The water-steam two-phase fluid is led into the steam-water separation device 3 through a line 8-3, and merged with water-steam two-phase fluid generated by the low temperature heat collection device 2. The water-steam two-phase fluid is separated into water and steam again by the steam-water separation device 3. Incidentally, potassium nitrate (coagulation point 334° C.) is used as the heat storage medium in the embodiment. However, other than potassium nitrate, for example, sodium nitrate (coagulation point 308° C.) may be used.

Of the superheated steam which was generated by the high temperature heat collection device 4, the superheated steam which was not extracted into the heat storage device 8 passes through a line 4-14. The flow rate of the superheated steam is measured by the flowmeter 14. The superheated steam is then led into the steam turbine 5 through a line 14-5. A mechanism is made so that the steam turbine 5 can be rotated by the superheated steam and electric power can be generated in the power generator 16 by the rotation of the steam turbine 5. Incidentally, the flow rate of the flowmeter 14 is supplied to the flow rate display panel 15. The flow rate display panel 15 has a mechanism to sound an alarm when the flow rate is out of a designed flow rate.

For example, due to the variation or decrease of the amount of solar radiation, the working fluid (water in the embodiment) may be heated insufficiently only by solar heat obtained at that time, i.e. the superheated steam for driving the steam turbine 5 may be insufficient only by solar heat obtained at that time. Under such a condition, water from the feedwater pump 1 passes through a line 1-9 so that the flow rate of the water can be adjusted by the water supply valve 9. Then, the adjusted water is delivered to the heat storage device 8 through a line 9-8. The water delivered to the heat storage device 8 passes through the water supply heat transfer pipe 10 to exchange heat with thermal energy held by the heat storage medium packed in the heat storage device 8. In this manner, superheated steam is generated at an outlet of the water supply heat transfer pipe 10.

The superheated steam generated by the water supply heat transfer pipe 10 passes through a line 8-14. The flow rate of the superheated steam is measured by the flowmeter 14. Then, the superheated steam passes is led into the steam turbine 5 through the line 14-5. A mechanism is made so that the steam turbine 5 can be rotated by the superheated steam and electric power can be generated in the power generator 16 by the rotation of the steam turbine 5. That is, at the branch point C, the superheated steam generated by the heat storage device 8 can be merged with the superheated steam which passes through the line 4-14 from the high temperature heat collection device 4.

Here, a line ranging from the steam turbine 5 to the low temperature heat collection device 2, i.e. a line constituted by a line 5-6, a line 6-1, the line 1-13, and the line 13-2 corresponds to a "water supply line" in the invention. In addition, a line ranging from the high temperature heat collection device 4 to the steam turbine 5, i.e. a line constituted by the line 4-14 and the line 14-5 corresponds to a "superheated steam supply line" in the invention.

In addition, a line ranging from a branch point B in the middle of the line 4-14 to an inlet of the superheated steam heat transfer pipe 11 of the heat storage device 8 via the steam extraction valve 7 corresponds to a "first line" in the invention. In addition, a line ranging from a branch point A in the middle of the line 1-13 to an inlet of the water supply heat transfer pipe 10 of the heat storage device 8 via the water supply valve 9 corresponds to a "second line" in the invention. In addition, a line ranging from the heat storage device 8 to the branch point C in the middle of the line 4-14 corresponds to a "third line" in the invention. In addition, a line ranging from the steam-water separation device 3 to a branch point D in the middle of the line 6-1 corresponds to a "fourth line" in the invention. In addition, a line ranging from the outlet of the superheated steam heat transfer pipe 11 of the heat storage device 8 to the steam-water separation device 3 corresponds to a "fifth line" in the invention.

In this manner, the solar power system according to the embodiment uses a configuration in which superheated steam generated by a two-stage heating system heat collection apparatus constituted by the low temperature heat collection device 2 and the high temperature heat collection device 4 and superheated steam generated by the heat storage device 8 are supplied in parallel and to the steam turbine. Accordingly, even in such a situation that the superheated steam for driving the steam turbine 5 is insufficient only by solar heat obtained at that time, for example, due to the variation or decrease of the amount of solar radiation, the steam turbine 5 can be supplied (assisted) with the superheated steam generated by the heat storage device 8 rapidly. Moreover, since it is not necessary to provide a device for collecting sunlight in the heat storage device 8 and the line 8-C, the system configuration can be made inexpensive and simple.

Here, the heat storage device 8 is designed suitably in consideration of the maximum flow rate (Nm3/s), the temperature and the pressure of the superheated steam supplied to the steam turbine 5, the kind and the heat capacity of the heat storage medium, etc. In addition, the heat storage device 8 used in the embodiment is configured so that the flow of the fluid flowing through the superheated steam heat transfer pipe 11 and the flow of the fluid flowing through the water supply heat transfer pipe 10 can be opposed to each other and the heat transfer pipes for these fluids can be disposed adjacently to each other. This is to increase heat transfer efficiency. Incidentally, the inside of the heat storage device 8 may be partitioned into a plurality of spaces by heat insulating walls.

In addition, the embodiment has a configuration in which a spray valve 21 is provided in the middle of a line 7-8 so that the spraying rate can be adjusted by the spray valve 21. In addition, the thermometer 19 for measuring the temperature of the superheated steam heated by the high temperature heat collection device 4 is provided in the line 4-7. A measurement signal of the thermometer 19 is supplied to the arithmetic device 20 so that the spray valve 21 can be adjusted based on the measurement signal. Thus, the temperature of the superheated steam extracted from the high temperature heat collection device 4 and passing through the line 7-8 can be controlled to be lower than a predetermined temperature.

Here, in the embodiment, the aforementioned predetermined temperature is set at 450° C. This is to prevent the temperature of the superheated steam from reaching the temperature of 450° C. at and above which potassium nitrate packed in the heat storage device 8 will deteriorate. Thus, the temperature of the superheated steam is adjusted by the spray valve 21 so as to prevent deterioration of the heat storage medium.

In addition, in the embodiment, on receiving a detection signal of the flowmeter 30 and a detection signal of the water level gauge 31 as inputs, the arithmetic device 12 adjusts a valve opening degree of the water supply valve 13 and a valve opening degree of the steam extraction valve 7. Thus, the flow rate of water delivered to the low temperature heat collection device 2 and the amount of superheated steam delivered to the heat storage device 8 can be adjusted. More in detail, the valve opening degree of the water supply valve 13 and the valve opening degree of the steam extraction valve 7 are controlled so that the outlet temperature of the low temperature heat collection device 2 can be kept at 350° C. and the outlet temperature of the superheated steam heat transfer pipe 11 can be kept likewise at 350° C. This is to keep the temperature of the superheated steam at 350° C. which is higher than the coagulation point 334° C. of potassium nitrate packed in the heat storage device 8 so as to prevent potassium nitrate from coagulating.

Incidentally, when the outlet temperature of the superheated steam heat transfer pipe 11 still exceeds 350° C. in spite of the adjustment of the valve opening degree of the water supply valve 13 and the valve opening degree of the steam extraction valve 7, the arithmetic device 20 makes control to increase the valve opening degree of the spray valve 21 so that the inlet temperature of the superheated steam heat transfer pipe 11 can be reduced.

In this manner, the solar power system according to the embodiment has a configuration in which potassium nitrate as a heat storage medium hardly coagulates so that it is not necessary to provide a large-sized agitator for preventing coagulation of potassium nitrate. Accordingly, the equipment cost can be suppressed. In addition, in the solar power system according to the embodiment, not only the water-steam two-phase fluid of about 350° C. supplied from the low temperature heat collection device 2 to the steam-water separation device 3 but also the water-steam two-phase fluid of about 350° C. supplied from the heat storage device 8 to the steam-water separation device 3 are recovered in the steam-water separation device 3, in which the water-steam two-phase fluids are separated into water and saturated steam, and only the saturated steam can be supplied to the high temperature heat collection device 4. Accordingly, the amount of saturated steam supplied to the high temperature heat collection device 4 is increased (the amount of heat recovery is increased) so that thermal efficiency can be improved.

Further, the thermometer 17 for measuring the temperature of the fluid flowing through the line 14-5 is provided and a measurement signal of the thermometer 17 is supplied to the arithmetic device 18. Thus, the opening degree of the water supply valve 9 is changed by the arithmetic device 18 so that the amount of water supply to the heat storage device 8 can be adjusted.

Figure 2:
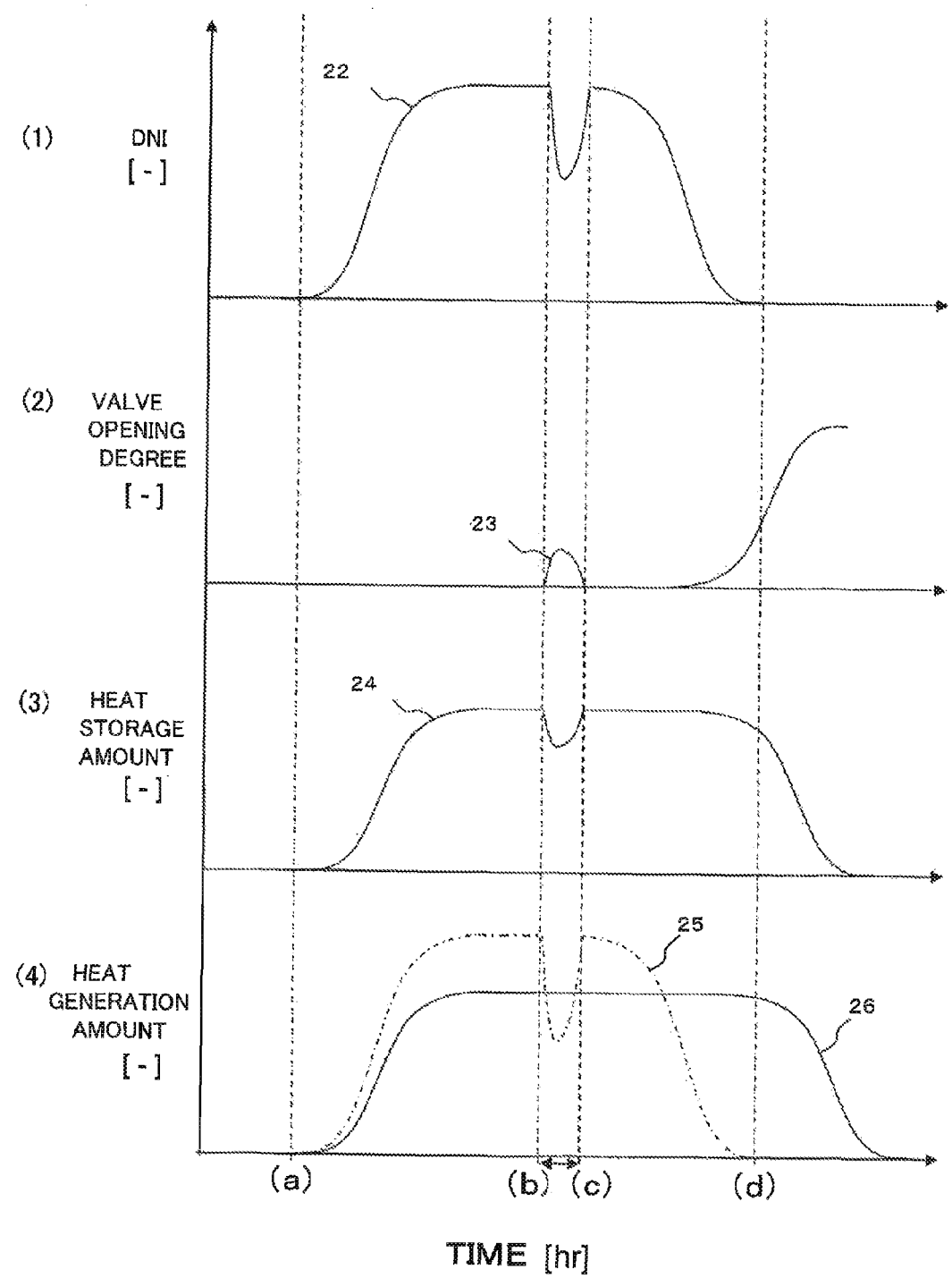
FIG. 2 A graph showing the relation among the change of an amount of solar radiation, a valve opening degree of a water supply valve 9, a heat storage amount of a heat storage device 8, and a power generation amount of a power generator 16 in the solar power system shown in FIG. 1.

Next, an operating state when the solar power system according to the embodiment is used will be described with reference to FIG. 2. FIG. 2 is a graph showing the relation among the change of the amount of solar radiation, the valve opening degree of the water supply valve 9, the amount of heat storage of the heat storage device 8, and the amount of power generation of the power generator 16 in the solar power system according to the embodiment. The abscissa in FIG. 2 represents time, in which (a) indicates a sunrise time, (b) indicates a variation start time of DNI (Direct Normal Irradiance), (c) indicates a variation end time of the DNI, and (d) indicates a sunset time. In addition, the reference numeral 22 in FIG. 2(1) designates the DNI in the daytime. The reference numeral 23 in FIG. 2 (2) designates the valve opening degree of the water supply valve 9. The reference numeral 24 in FIG. 2(3) designates the amount of heat storage corresponding to the DNI 22 and the valve opening degree 23 in the daytime. The reference numeral 26 in FIG. 2 (4) designates an example of the amount of power generation when the heat storage device 8 is installed. Incidentally, the reference numeral 25 in FIG. 2(4) designates an example of the amount of power generation when the heat storage device 8 is not installed.

As shown in FIG. 2, after the time (a), both the amount of heat storage (3) and the amount of power generation (4) increase with the increase of the DNI. The amount of power generation becomes stable when it reaches the designed amount of power generation. During the period between the times (b) and (c) when the DNI in the daytime decreases due to the influence of clouds etc., the valve opening degree of the water supply valve 9 is increased as in FIG. 2(2) to increase the amount of water supply of the line 9-8. Stored thermal energy is exchanged with the heat of the water as in FIG. 2(3) to generate superheated steam. Thus, electric power can be generated as stably as the amount of power generation 26 when the heat storage device 8 is installed in FIG. 2(4). On the other hand, in the case 25 where the heat storage device 8 is not installed, the amount of power generation becomes unstable temporarily due to the variation of the DNI in the daytime. Further, in the case 26 where the heat storage device 8 is installed, power generation based on stored thermal energy can be made also on and after the time (c).

As described above, according to the solar power system according to the embodiment, it is not necessary to separately provide a heat collection device for generating superheated steam in the heat storage device 8. Accordingly, the equipment cost and the construction cost can be reduced. In addition, according to the solar power system according to the embodiment, the temperature of the heat storage medium (potassium nitrate in the embodiment) packed in the heat storage device 8 can be kept within the predetermined temperature range. Accordingly, coagulation or deterioration of the heat storage medium can be prevented. Therefore, since it is not necessary to install an agitator etc. for preventing coagulation of the heat storage medium, the equipment cost can be suppressed. Moreover, since the heat storage medium hardly deteriorates, the maintenance cost of the equipment can be also suppressed.

In addition, the solar power system according to the embodiment has a configuration in which heat can be stored in the heat storage device 8 without using any other heat carrying medium than water (steam). In other words, the embodiment is a system in which it is not necessary to use high-viscosity fluid (e.g. oil or molten salt) as the heat carrying medium. Accordingly, it is not necessary to provide a device for heating pipes in order to prevent coagulation of the high-viscosity fluid but it is possible to make the equipment simple. Moreover, since the fluid is water, it is possible to use an inexpensive pump in comparison with the case where the high-viscosity fluid is handled.

In addition, when, for example, the high temperature heat collection device 4 is set as a tower device, it is necessary to raise the fluid from the ground up to a height of about 40 m to 150 m. However, according to the configuration of the embodiment, the steam-water separation device 3 is provided so that only saturated steam can be delivered to the high temperature heat collection device 4. Accordingly, it is possible to install a superheated steam pump more inexpensive than a water-steam two-phase fluid pump. Thus, the equipment cost can be reduced.

In addition, according to the solar power system according to the embodiment, the temperature of superheated steam to be supplied to the heat storage device 8 can be adjusted by the spray valve 21. Accordingly, it is also possible to reduce the damage of the superheated steam heat transfer pipe 11 of the heat storage device 8. In addition, in the embodiment, the temperature of the heat storage medium packed in the heat storage device 8 can be kept, for example, at a temperature a little lower than 450° C. Accordingly, superheated steam can be generated only by the heat storage device 8 even in the nighttime. Thus, it is not necessary to back up power generation in the nighttime with thermal power generation etc. Therefore, the solar power system according to the embodiment can also contribute to reduction in fuel cost and $CO_2$ emission.

Successively, solar power systems according to second to seventh embodiments of the invention will be described in turn. Incidentally, in the following description, the same constituents as those in the first embodiment will be referred to by the same numerals or signs correspondingly and respectively and detailed description thereof will be omitted.

Second Embodiment

Figure 3:
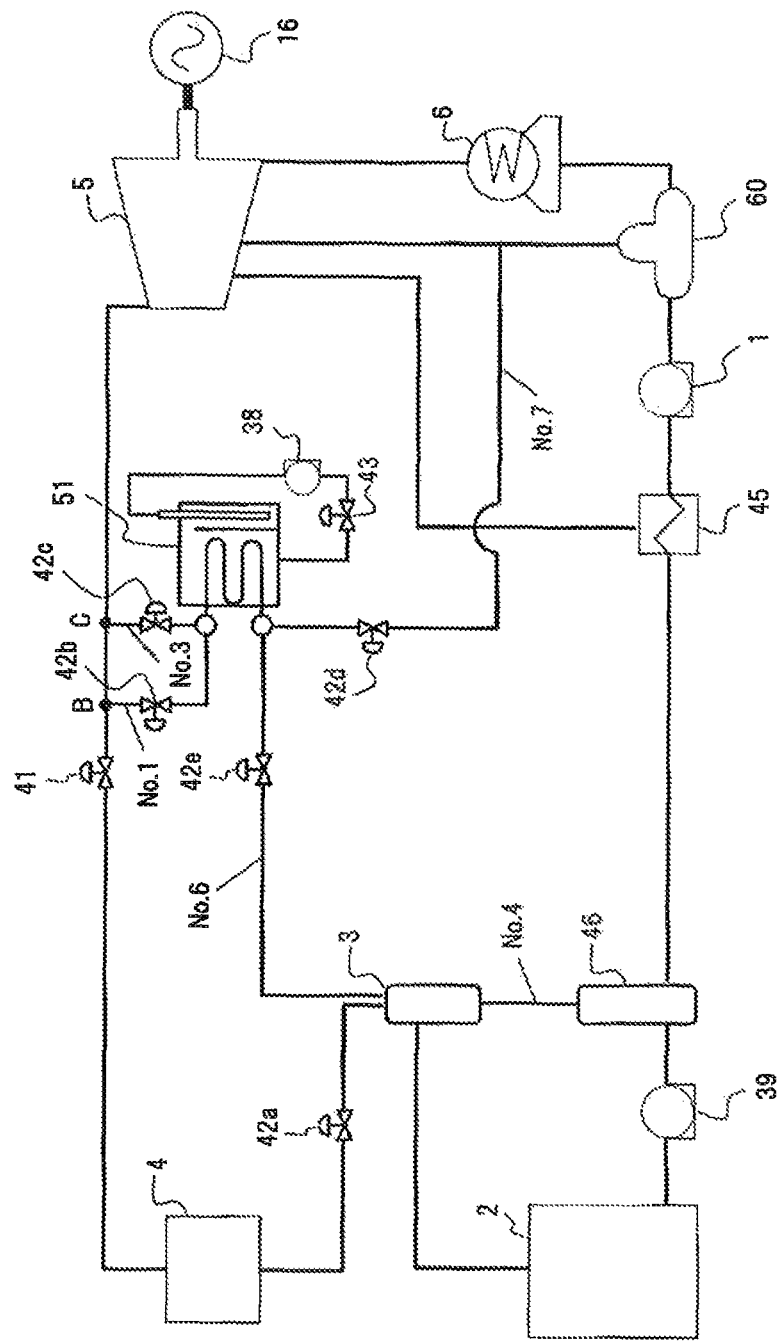
FIG. 3 A schematic view of the configuration of a solar power system according to a second embodiment of the invention.

FIG. 3 is a view of the configuration of a solar power system according to a second embodiment of the invention. In the drawing, the reference numeral 1 designates a feedwater pump; 2, a low temperature heat collection device; 3, a steam-water separation device; 4, a high temperature heat collection device; 5, a steam turbine; 6, a gland condenser; 16, a power generator; 38, a medium circulation pump; 39, a main circulation pump; 41, a main steam valve; 42a to 42e, changeover valves; 43; a flow rate regulation valve; 45, a feedwater heater; 46, a tank; 51, a high temperature heat storage device; and 60, a deaerator which reduces or removes dissolved oxygen in supplied water.

A line 6-2 which is formed to connect the gland condenser 6, the deaerator 60, the feedwater pump 1, the feedwater heater 45, the tank 46, the main circulation pump 39, and the low temperature heat collection device 2 corresponds to a "water supply line" which supplies water to the low temperature heat collection device 2. A line 4-5 formed to connect the high temperature heat collection device 4 and the steam turbine 5 corresponds to a "superheated steam supply line" which supplies superheated steam to the steam turbine 5. In addition, a line B-51 (No. 1) corresponds to a "first line" in the invention. A line C-51 (No. 3) corresponds to a "third line" in the invention. A line 3-46 (No. 4) corresponds to a "fourth line" in the invention. A line 3-51 (No. 6) corresponds to a "sixth line" in the invention. A line 51-60 (No. 7) corresponds to a "seventh line" in the invention. Incidentally, actions of the various valves, the various pumps etc. are controlled by a not-shown arithmetic device.

Figure 4:
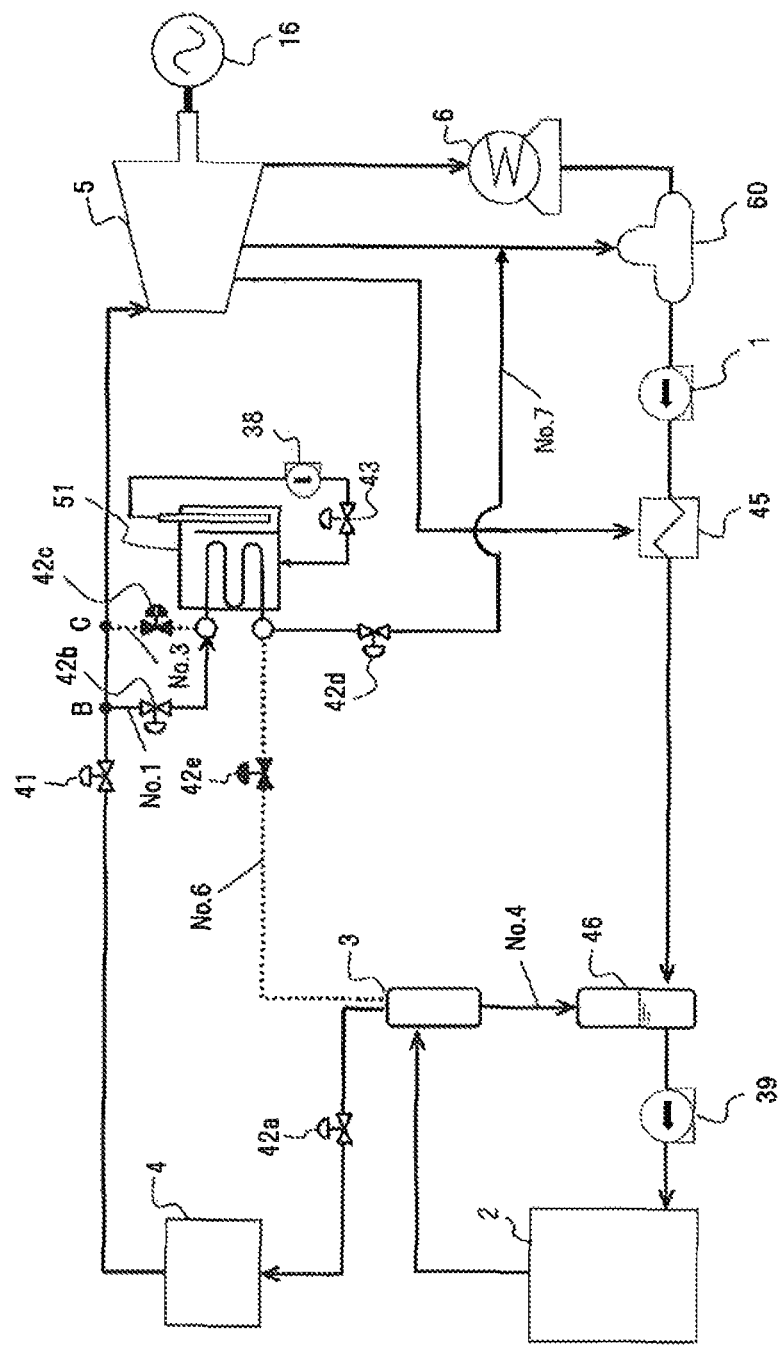
FIG. 4 A view showing the state of a heat storage operation mode of the solar power system shown in FIG. 3.
Figure 5:
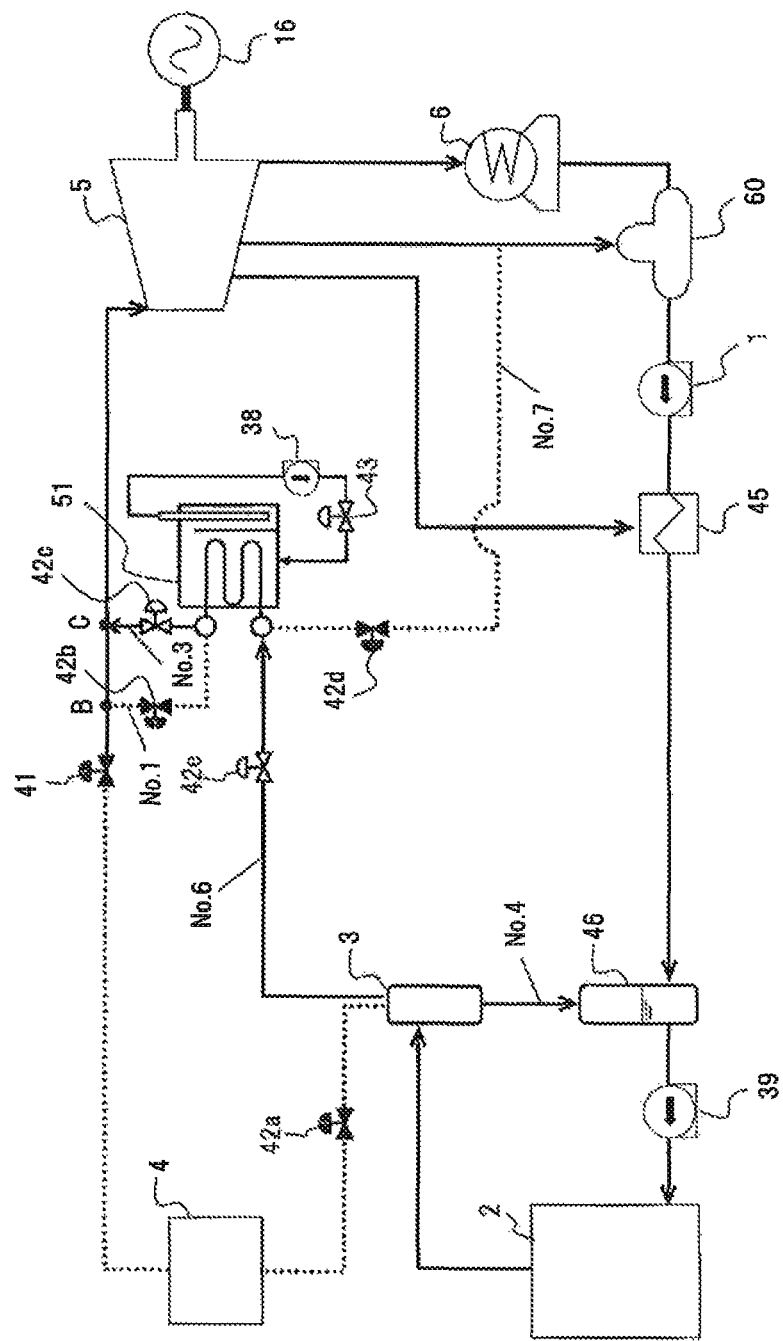
FIG. 5 A view showing the state of a heat release operation mode of the solar power system shown in FIG. 3.

As shown in FIG. 3, the solar power system according to the second embodiment is different from the solar power system according to the first embodiment mainly in the point that the line 3-51 is provided for supplying saturated steam separated by the steam-water separation device 3 to the high temperature heat storage device 51. Operation modes of the solar power system according to the second embodiment will be described with reference to FIG. 4 and FIG. 5. FIG. 4 shows an operating state in a heat storage operation mode of the solar power system according to the second embodiment. FIG. 5 shows an operating state in a heat release operation mode of the same system.

Incidentally, in the drawings, an arrow designates a direction of the flow of working fluid (steam or water), a solid line designates a line through which the working fluid passes, and a dotted line designates a line which is closed during the operation of the system. In addition, in the drawings, a valve painted in black indicates that it is closed and a valve painted in white indicates that it is open.

<Heat Storage Operation Mode>

As shown in FIG. 4, water is delivered to the feedwater heater 45 by the feedwater pump 1 and preheated in the feedwater heater 45 by extracted steam from the steam turbine 5. Then, the preheated water passes through a line 45-46 to be reserved in the tank 46. The water in the tank 46 is delivered by the main circulation pump 39 to the low temperature heat collection device 2 in which the water is heated by solar energy to be turned into water-steam two-phase fluid. The water-steam two-phase fluid generated by the low temperature heat collection device 2 flows through a line 2-3. Then, the water-steam two-phase fluid is separated into saturated steam and saturated water by the steam-water separation device 3. The saturated steam is supplied to the high temperature heat collection device 4 in which the saturated steam is further heated by solar energy to be turned into superheated steam. On the other hand, the saturated water separated by the steam-water separation device 3 flows through the line 3-46 to be reserved in the tank 46. That is, the saturated water separated by the steam-water separation device 3 merges with water supplied from the feedwater pump 1.

The superheated steam generated by the high temperature heat collection device 4 is supplied to the steam turbine 5 through the line 4-5 so that the steam turbine 5 can be driven. When the steam turbine 5 is driven, the power generator 16 connected to the steam turbine 5 generates electric power. Steam expelled from the steam turbine 5 is converted back to water by the gland condenser 6. After flowing through the deaerator 60, the converted water is supplied to the tank 46 again by the feedwater pump 1.

A part of the superheated steam passing through the line 4-5 branches off at a branch point B to be supplied to the high temperature heat storage device 51 through the change-over valve 42b. A heat transfer pipe is installed in the high temperature heat storage device 51. The superheated steam circulates through the inside of the heat transfer pipe while a second heat storage medium (e.g. potassium nitrate, sodium nitrate, or the like) circulates through the outside of the heat transfer pipe. Thus, heat exchange is performed between the superheated steam and the second heat storage medium. A part of the thermal energy held by the high temperature superheated steam moves to the second heat storage medium so that heat can be stored in the second heat storage medium. Here, the circulation rate of the second heat storage medium is adjusted by the medium circulation pump 38 and the flow rate regulation valve 43 so that the degree of steam dryness of the superheated steam which has passed through the high temperature heat storage device 51 can be larger than 0. That is, molten salt as the second heat storage medium packed in the high temperature heat storage device 51 is controlled at a temperature where the molten salt cannot coagulate. The steam which has passed through the high temperature heat storage device 51 flows through the line 51-60 to be returned to the deaerator 60. The returned steam is deaerated and then used as supplied water again. Incidentally, an annular line constituted by a line 51-38, a line 38-43 and a line 43-51 corresponds to a "molten salt circulation line" in the invention.

<Heat Release Operation Mode>

As shown in FIG. 5, water is delivered to the feedwater heater 45 by the feedwater pump 1 and preheated in the feedwater heater 45 by extracted steam from the steam turbine 5. Then, the preheated water passes through the line 45-46 to be reserved in the tank 46. The water in the tank 46 is delivered by the main circulation pump 39 to the low temperature heat collection device 2 in which the water is heated by solar energy to be turned into water-steam two-phase fluid. The water-steam two-phase fluid generated by the low temperature heat collection device 2 flows through the line 2-3. Then, the water-steam two-phase fluid is separated into saturated steam and saturated water by the steam-water separation device 3.

The saturated steam is supplied to the high temperature heat storage device 51 and exchanges heat with the second heat storage medium packed in the high temperature heat storage device 51. Thus, the saturated steam is turned into superheated steam. The superheated steam generated by the high temperature heat storage device 51 is supplied to the steam turbine 5 through the line 51-C and a line 5-C. On the other hand, the saturated water separated by the steam-water separation device 3 flows through the line 3-46 to be reserved in the tank 46. That is, the saturated water separated by the steam-water separation device 3 merges with water supplied from the feedwater pump 1.

In this manner, in the solar power system according to the second embodiment, the configuration can be simplified and the inlet pressure of the steam turbine 5 in the heat storage operation mode can be made substantially equivalent to that in the heat release operation mode. Accordingly, there is substantially no difference in power generation efficiency between the two operation modes. In addition, water can be circulated and reused so that a waste of water resources can be reduced. Further, according to the solar power system according to the second embodiment, it is also possible to expect an effect that an output of power generation can be leveled with respect to the variation of the amount of solar radiation in the daytime. Incidentally, the solar power system according to the second embodiment is preferable in the case where there are lots of cloudy or rainy days and heat release operation is short in time.

Third Embodiment

Figure 6:
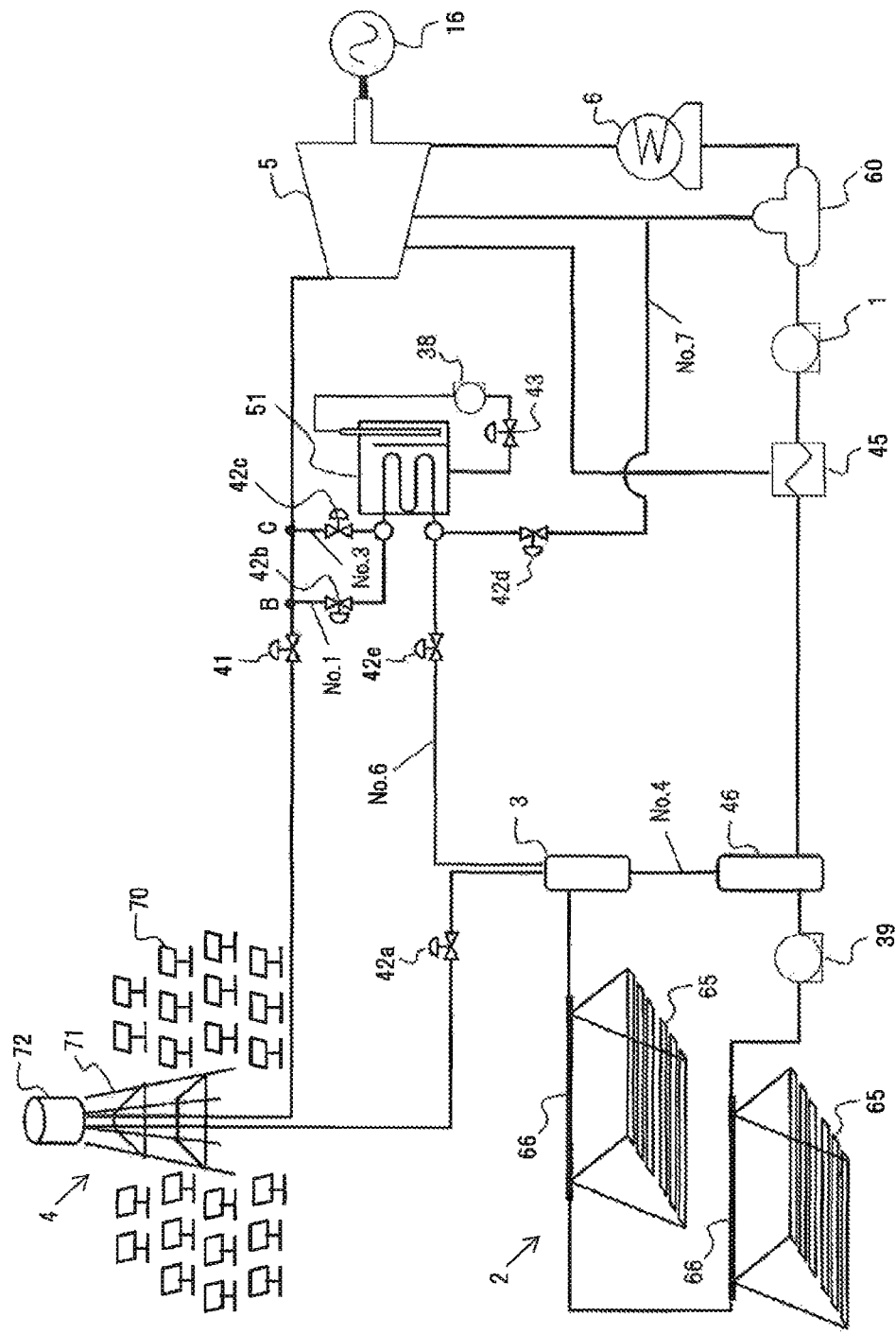
FIG. 6 A schematic view of the configuration of a solar power system according to a third embodiment of the invention.

FIG. 6 is a view of the configuration of a solar power system according to a third embodiment of the invention. The solar power system according to the third embodiment is characterized in that a Fresnel type light/heat collection device is used as the low temperature heat collection device 2 and a tower type light/heat collection device is used as the high temperature heat collection device 4 in comparison with the configuration of the solar power system according to the second embodiment. However, the remaining configuration of the solar power system according to the third embodiment is the same as that in the second embodiment. Therefore, duplicate description thereof will be omitted.

In the tower type light/heat collection device shown in FIG. 6, a heat transfer pipe panel 72 is installed on a tower 71 having a predetermined height (about 30 m to 100 m). On the other hand, a large number of heliostats 70 are disposed in various directions on the ground surface. While tracking the movement of sunlight, the heliostats 70 arranged as a group concentrate light on the heat transfer pipe panel 72 so that superheated steam can be generated. The tower type light/heat collection device can generate higher temperature steam than a trough type or Fresnel type light/heat collection device. Accordingly, there is an advantage that the tower type light/heat collection device can increase turbine efficiency and obtain more electric power.

In addition, the Fresnel type light/heat collection device shown in FIG. 6 is configured as follows. That is, a large number of light collection mirrors 65 which are planar or slightly curved are arranged with their angles being changed little by little. Heat transfer pipes 66 which are arranged as a group and each of which is shaped like a panel are disposed horizontally and located to be several meters high above the group of light collection mirrors 65. Sunlight is concentrated on the group of heat transfer pipes 66 by the group of light collection mirrors 65 to heat water circulating inside the respective heat transfer pipes 66 so that water-steam two-phase fluid is generated from the heat transfer pipes 66. It is a matter of course that a trough type light/heat collection device may be used in place of the Fresnel type light/heat collection device in the embodiment. The structure can be simplified by use of the trough type or Fresnel type light/heat collection device.

Fourth Embodiment

Figure 7:
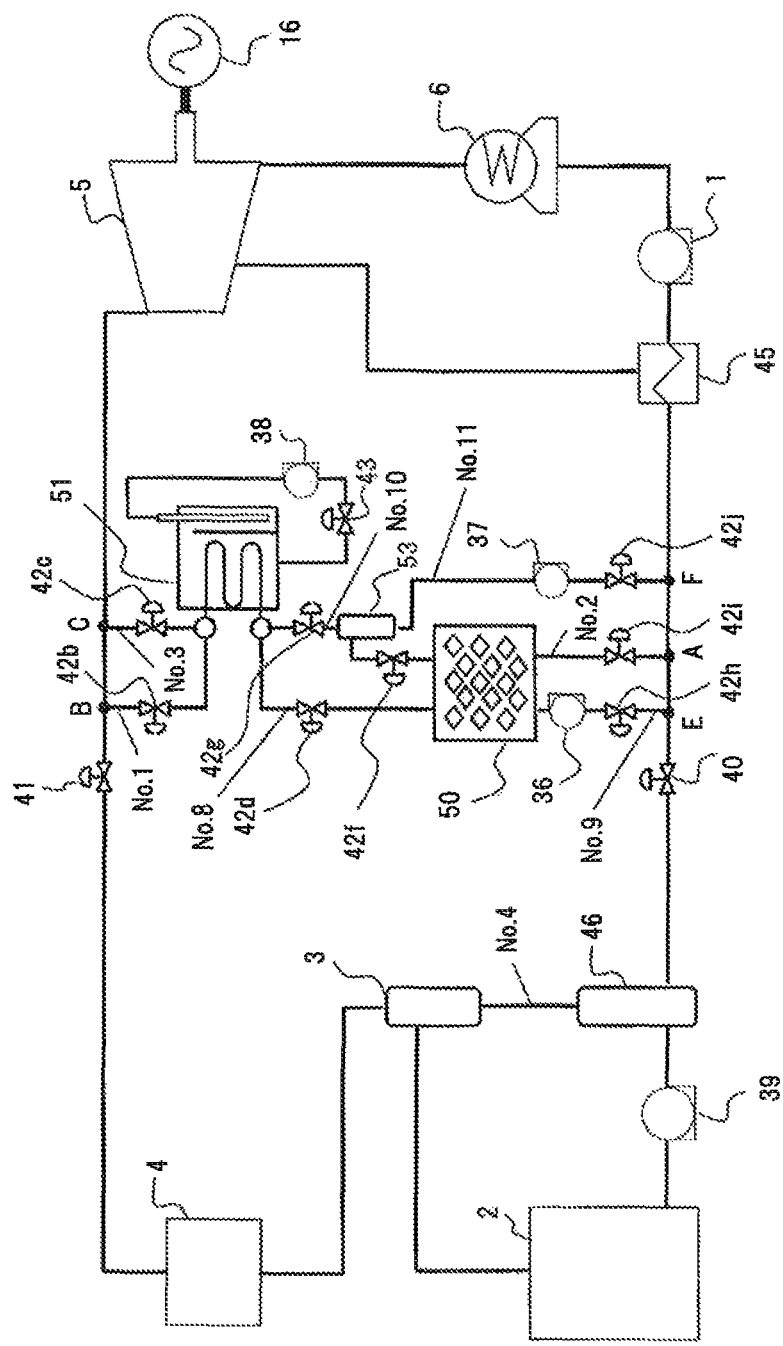
FIG. 7 A schematic view of the configuration of a solar power system according to a fourth embodiment of the invention.

FIG. 7 is a view of the configuration of a solar power system according to a fourth embodiment of the invention. In this drawing, the reference numeral 1 designates a feedwater pump; 2, a low temperature heat collection device; 3, a steam-water separation device; 4, a high temperature heat collection device; 5, a steam turbine; 6, a gland condenser; 16, a power generator; 36, a pressure boosting pump; 37, a sub circulation pump; 38, a medium circulation pump; 39, a main circulation pump; 40, a water supply valve; 41, a main steam valve; 42b to 42d and 42f to 42j, changeover valves; 43; a flow rate regulation valve; 45, a feedwater heater; 46, a tank; 50, a low temperature heat storage device; 51, a high temperature heat storage device; and 53, a sub steam-water separation device.

A line 6-2 which is formed to connect the gland condenser 6, the feedwater pump 1, the feedwater heater 45, the tank 46, the main circulation pump 39, and the low temperature heat collection device 2 corresponds to a "water supply line" which supplies water to the low temperature heat collection device 2. A line 4-5 formed to connect the high temperature heat collection device 4 and the steam turbine 5 corresponds to a "superheated steam supply line" which supplies superheated steam to the steam turbine 5. In addition, a line B-51 (No. 1) corresponds to a "first line" in the invention. A line A-50 (No. 2) corresponds to a "second line" in the invention. A line C-51 (No. 3) corresponds to a "third line" in the invention. A line 3-46 (No. 4) corresponds to a "fourth line" in the invention. A line 51-50 (No. 8) corresponds to an "eighth line" in the invention. A line 50-E (No. 9) corresponds to a "ninth line" in the invention. A line 50-53 and a line 53-51 (No. 10) correspond to a "tenth line" in the invention. A line 53-F (No. 11) corresponds to an "eleventh line" in the invention. Incidentally, actions of the various valves, the various pumps etc. are controlled by a not-shown arithmetic device.

Figure 8:
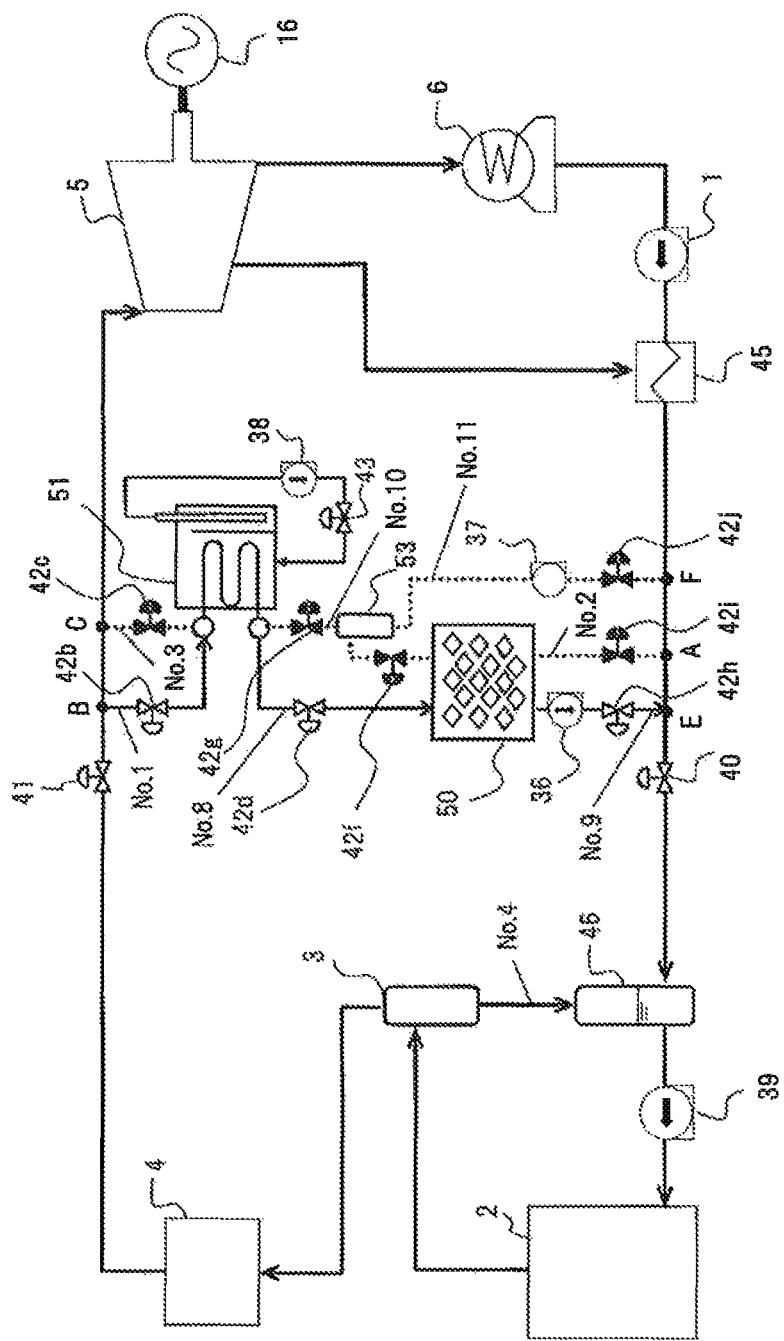
FIG. 8 A view showing the state of a heat storage operation mode of the solar power system shown in FIG. 7.
Figure 9:
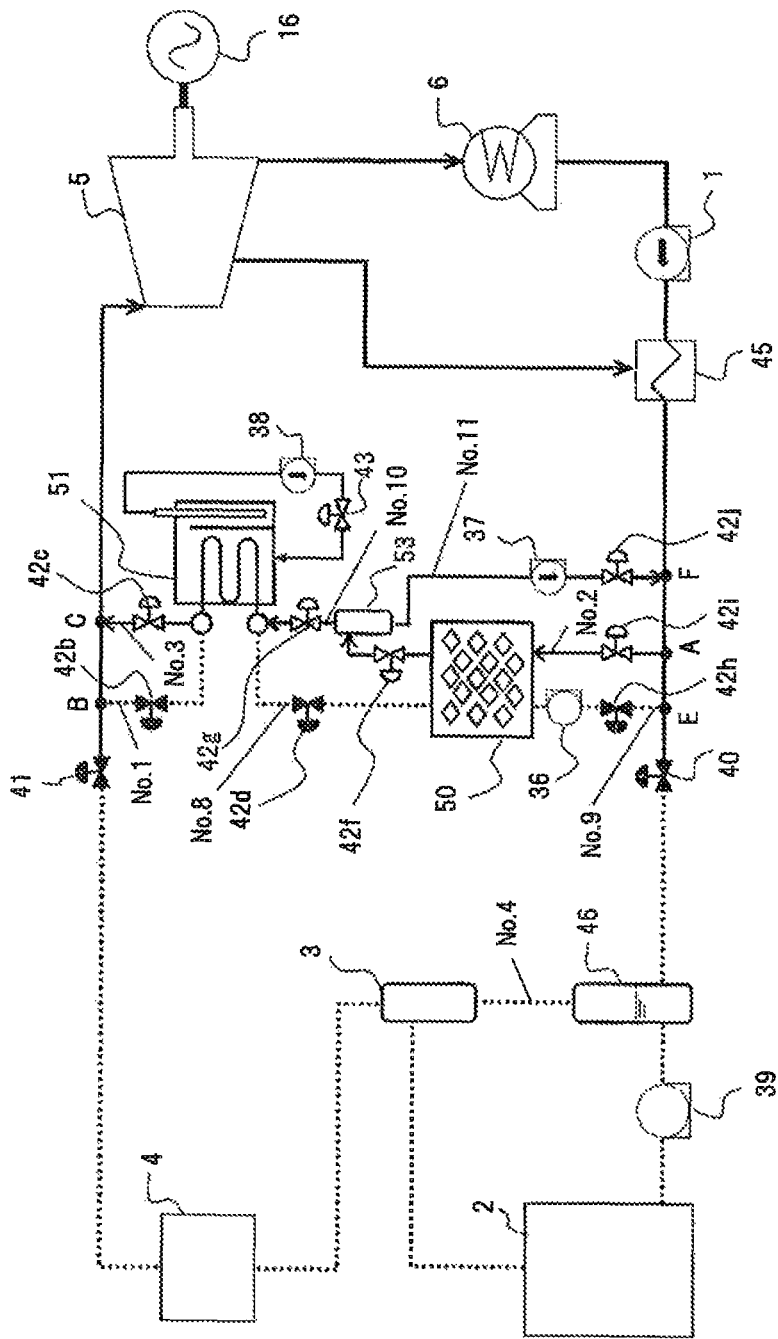
FIG. 9 A view showing the state of a heat release operation mode of the solar power system shown in FIG. 7.

As shown in FIG. 7, the solar power system according to the fourth embodiment is different from the solar power system according to the first embodiment mainly in the point that two heat storage devices, i.e. the low temperature heat storage device 50 and the high temperature heat storage device 51 are provided. Operation modes of the solar power system according to the fourth embodiment will be described with reference to FIG. 8 and FIG. 9. FIG. 8 shows an operating state in a heat storage operation mode of the solar power system according to the fourth embodiment. FIG. 9 shows an operating state in a heat release operation mode of the same system.

Incidentally, in the drawings, an arrow designates a direction of the flow of working fluid (steam or water), a solid line designates a line through which the working fluid passes, and a dotted line designates a line which is closed during the operation of the system. In addition, in the drawings, a valve painted in black indicates that it is closed and a valve painted in white indicates that it is open.

<Heat Storage Operation Mode>

As shown in FIG. 8, water is delivered to the feedwater heater 45 by the feedwater pump 1 and preheated in the feedwater heater 45 by extracted steam from the steam turbine 5. Then, the preheated water passes through a line 45-46 to be reserved in the tank 46. The water in the tank 46 is delivered by the main circulation pump 39 to the low temperature heat collection device 2 in which the water is heated by solar energy to be turned into water-steam two-phase fluid. The water-steam two-phase fluid generated by the low temperature heat collection device 2 flows through a line 2-3. Then, the water-steam two-phase fluid is separated into saturated steam and saturated water by the steam-water separation device 3. The saturated steam is supplied to the high temperature heat collection device 4 in which the saturated steam is further heated by solar energy to be turned into superheated steam. On the other hand, the saturated water separated by the steam-water separation device 3 flows through the line 3-46 to be reserved in the tank 46. That is, the saturated water separated by the steam-water separation device 3 merges with water supplied from the feedwater pump 1.

The superheated steam generated by the high temperature heat collection device 4 is supplied to the steam turbine 5 through the line 4-5 so that the steam turbine 5 can be driven. When the steam turbine 5 is driven, the power generator 16 connected to the steam turbine 5 generates electric power. Steam expelled from the steam turbine 5 is converted back to water by the gland condenser 6 to be supplied to the tank 46 by the feedwater pump 1 again.

Apart of the superheated steam passing through the line 4-5 branches off at a branch point B to be supplied to the high temperature heat storage device 51 through the changeover valve 42b. Heat exchange is performed between the superheated steam and molten salt as a second heat storage medium in the high temperature heat storage device 51, so that heat can be stored in the molten salt. It is a matter of course that, also in the embodiment, actions of the medium circulation pump 38 and the flow rate regulation valve 43 are controlled to make the degree of steam dryness of an outlet of the high temperature heat storage device 51 larger than 0 in order to prevent the molten salt from coagulating.

The steam which has passed through the high temperature heat storage device 51 is led into the low temperature heat storage device 50 through the line 51-50. The steam led into the low temperature heat storage device 50 exchanges heat with a first heat storage medium (e.g. lithium nitrate as a phase change heat storage medium; $LiNo_3$) packed inside the low temperature heat storage device 50 so that the steam can be turned into condensed water. The pressure of the condensed water is boosted by the pressure boosting pump 36. Then, the condensed water is returned to the water supply line and used as supplied water again.

<Heat Release Operation Mode>

As shown in FIG. 9, water is supplied by the feedwater pump 1 and preheated in the feedwater heater 45 by extracted steam from the steam turbine 5. Then, the preheated water is supplied to the low temperature heat storage device 50 through a line 45-A and the line A-50. The water supplied to the low temperature heat storage device 50 exchanges heat with the first heat storage medium packed inside the low temperature heat storage device 50 to be turned into water-steam two-phase fluid. The water-steam two-phase fluid passes through the line 50-53. Then, the water-steam two-phase fluid is separated into saturated steam and saturated water by the sub steam-water separation device 53. The saturated water is returned to the water supply line by the sub circulation pump 37. The saturated steam flows through the line 53-51 to be supplied to the high temperature heat storage device 51. The saturated steam supplied to the high temperature heat storage device 51 exchanges heat with the second heat storage medium packed in the high temperature heat storage device 51 so that the saturated steam can be turned into superheated steam. The superheated steam flows through the line 51-C and a line C-5 sequentially to be supplied to the steam turbine 5.

In this manner, in the solar power system according to the fourth embodiment, the configuration can be simplified and the inlet pressure of the steam turbine 5 in the heat storage operation mode can be made substantially equivalent to that in the heat release operation mode. Accordingly, there is substantially no difference in power generation efficiency between these two operation modes. Incidentally, the solar power system according to the fourth embodiment is preferably used under an environment where the amount of solar radiation in the daytime is large and the variation thereof is small. For example, by performing operation in the heat storage operation mode in the daytime and operation in the heat release operation mode in the nighttime, the solar power system according to the fourth embodiment can generate electric power all day long.

Fifth Embodiment

Figure 10:
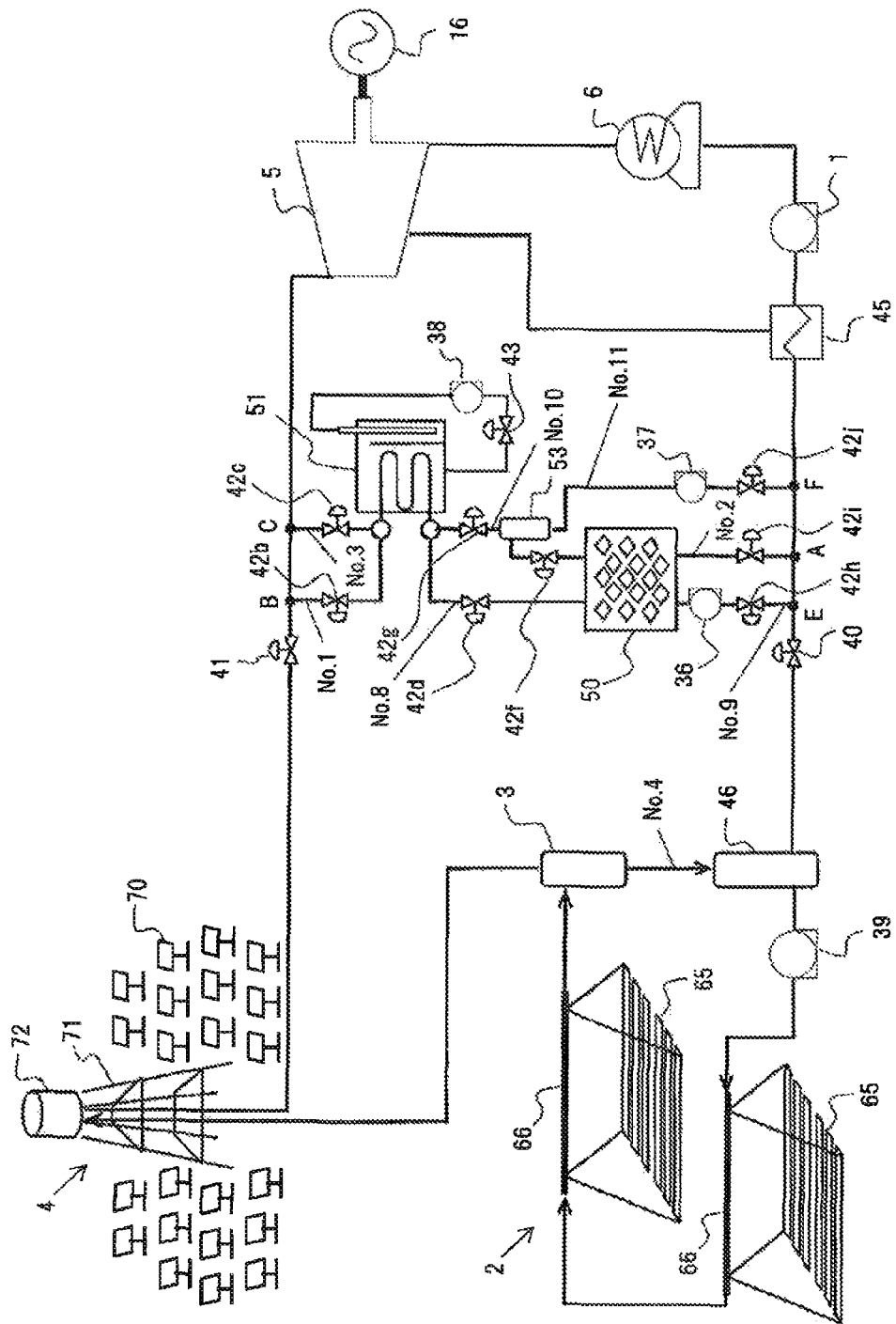
FIG. 10 A schematic view of the configuration of a solar power system according to a fifth embodiment of the invention.

FIG. 10 is a view of the configuration of a solar power system according to a fifth embodiment of the invention. The solar power system according to the fifth embodiment is characterized in that a Fresnel type light/heat collection device is used as the low temperature heat collection device 2 and a tower type light/heat collection device is used as the high temperature heat collection device 4 in comparison with the configuration of the solar power system according to the fourth embodiment. The remaining configuration of the solar power system according to the fifth embodiment is the same as that in the fourth embodiment. In addition, the tower type light/heat collection device and the Fresnel type light/heat collection device shown in FIG. 10 are the same in configuration as those devices used in the third embodiment. Therefore, description thereof will be omitted here. The solar power system according to the fifth embodiment can also perform operation in both modes, i.e. a heat storage operation mode and a heat release operation mode in the same manner as in the fourth embodiment. Thus, the solar power system according to the fifth embodiment can obtain equivalent functions and effects to those in the fourth embodiment.

Sixth Embodiment

Figure 11:
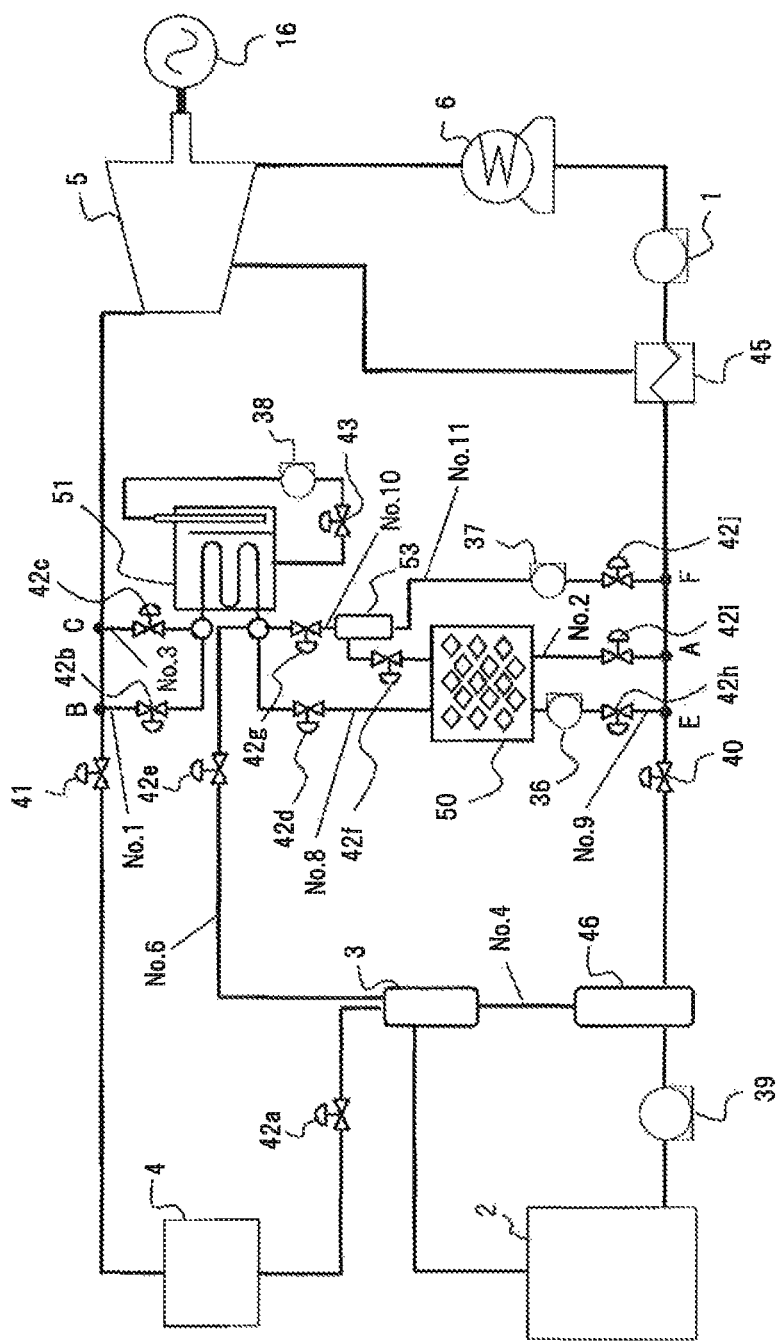
FIG. 11 A schematic view of the configuration of a solar power system according to a sixth embodiment of the invention.

FIG. 11 is a view of the configuration of a solar power system according to a sixth embodiment of the invention. The solar power system according to the sixth embodiment has a configuration in which a line 3-51 extending from the steam-water separation device 3 to the high temperature heat storage device 51 is added to the configuration of the solar power system according to the fourth embodiment, a changeover valve 42e is incorporated into the line 3-51 and a changeover valve 42a is incorporated into the line 3-4 extending from the steam-water separation device 3 to the high temperature heat collection device 4. In other words, configuration in which the line 3-51 and the changeover valves 42a and 42e used in the solar power system according to the second embodiment are incorporated into the solar power system according to the fourth embodiment is the solar power system according to the sixth embodiment of the invention.

Figure 12:
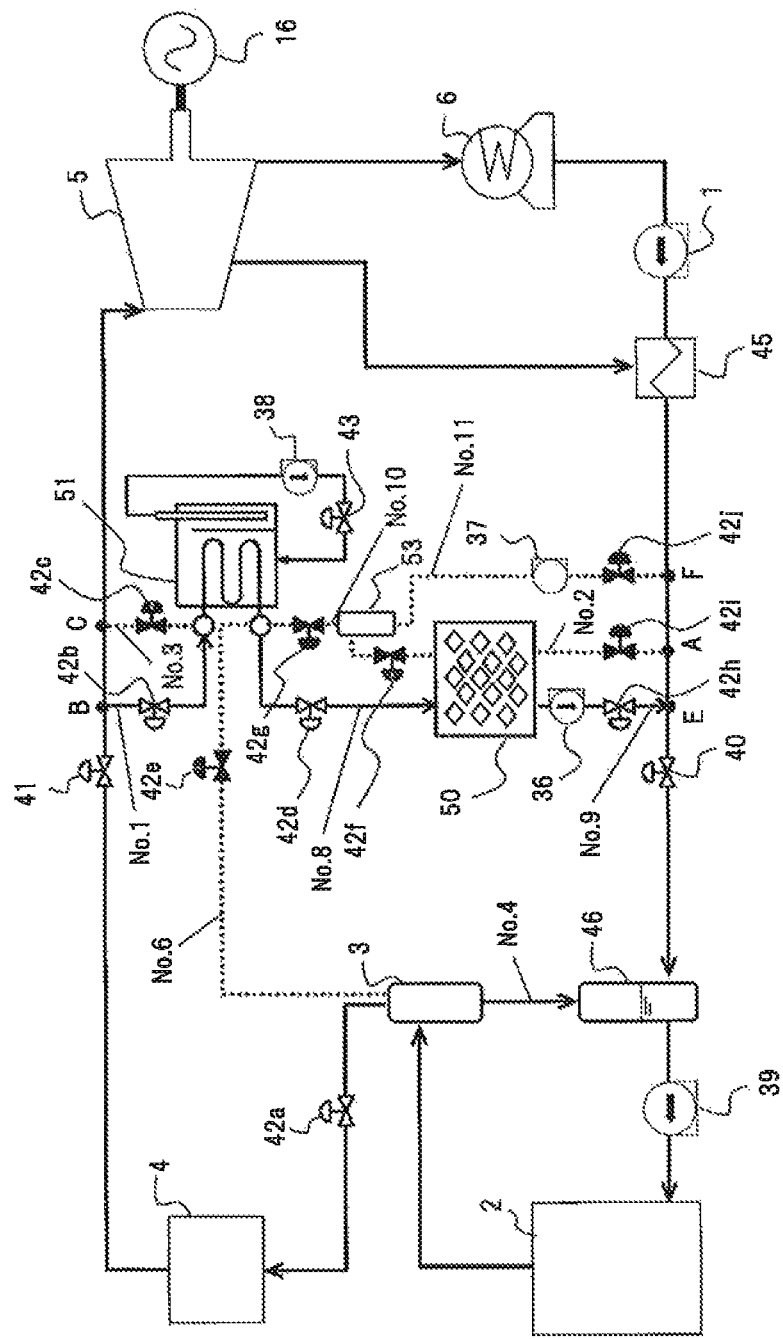
FIG. 12 A view showing the state of a heat storage operation mode of the solar power system shown in FIG. 11.
Figure 13:
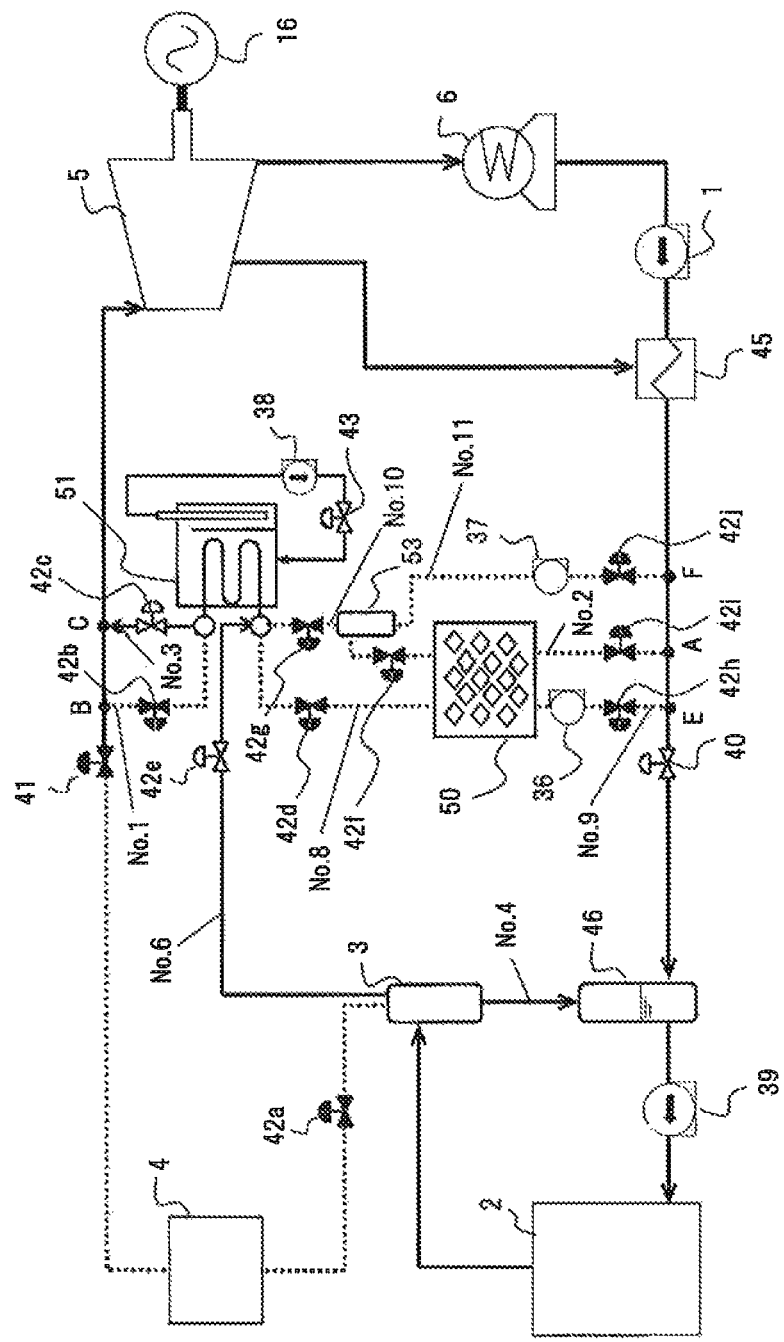
FIG. 13 A view showing the state of a short-time heat release operation mode of the solar power system shown in FIG. 11.
Figure 14:
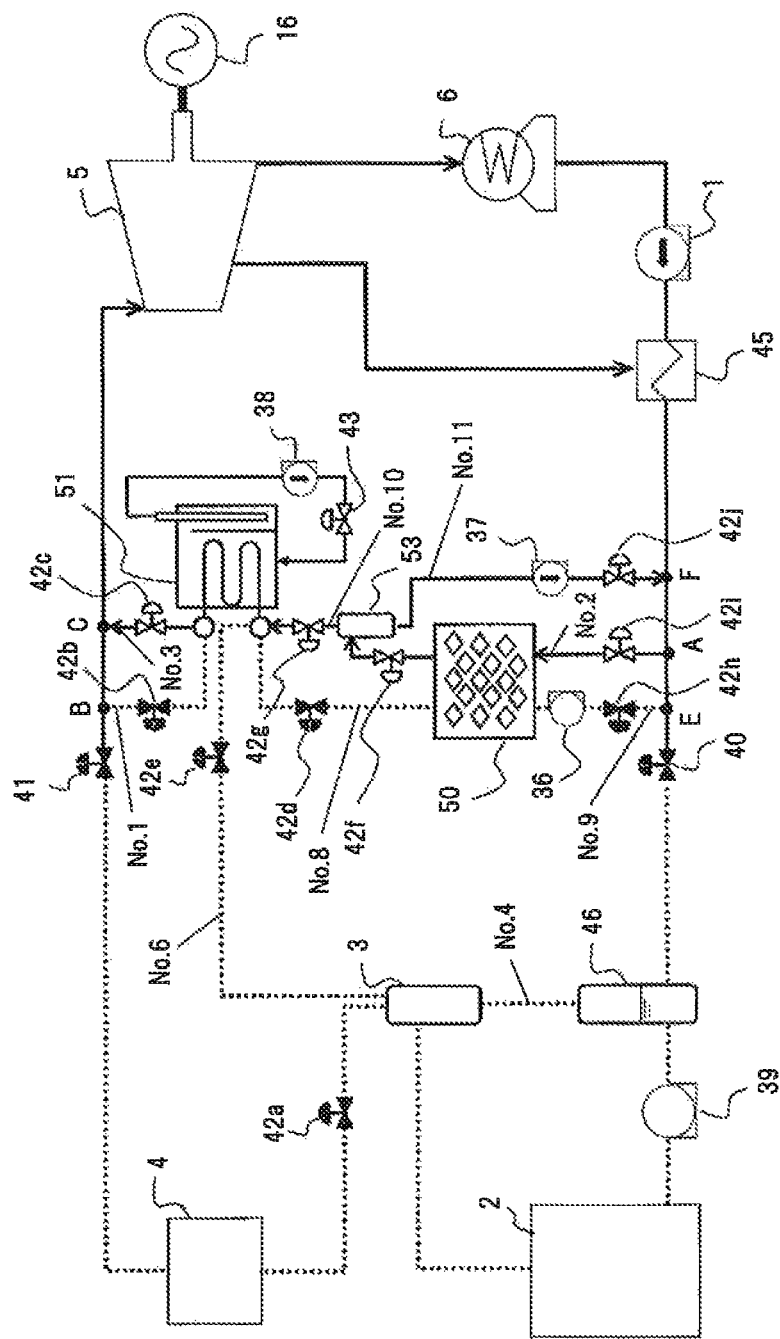
FIG. 14 A view showing the state of a long-time heat release operation mode of the solar power system shown in FIG. 11.

Next, operation modes of the solar power system according to the sixth embodiment will be described with reference to FIG. 12 to FIG. 14. FIG. 12 shows an operating state in a heat storage operation mode of the solar power system according to the sixth embodiment. FIG. 13 shows an operating state in a short-time heat release operation mode of the same system. FIG. 14 shows an operating state in a long-time heat release operation mode of the same system.

Incidentally, in the drawings, an arrow designates a direction of the flow of working fluid (steam or water), a solid line designates a line through which the working fluid passes, and a dotted line designates a line which is closed during the operation of the system. In addition, in the drawings, a valve painted in black indicates that it is closed and a valve painted in white indicates that it is open.

<Heat Storage Operation Mode>

As shown in FIG. 12, water is finally turned into superheated steam via the low temperature heat collection device 2 and the high temperature heat collection device 4, and supplied to the steam turbine 5. Steam expelled from the steam turbine 5 is condensed into water by the gland condenser 6 and supplied to the low temperature heat collection device 2 again. In addition, a part of the superheated steam flowing through the superheated steam supply line exchanges heat with the second heat storage medium of the high temperature heat storage device 51 and the first heat storage medium of the low temperature heat storage device 50 while flowing through the high temperature heat storage device 51 and the low temperature heat storage device 50 sequentially so that heat can be stored in the respective heat storage devices. Incidentally, since the heat storage operation mode in the embodiment is the same as that in the fourth embodiment, detailed description thereof will be omitted.

<Short-Time Heat Release Operation Mode>

As shown in FIG. 13, water is delivered to the feedwater heater 45 by the feedwater pump 1 and preheated in the feedwater heater 45 by extracted steam from the steam turbine 5. Then, the preheated water passes through the line 45-46 to be reserved in the tank 46. The water in the tank 46 is delivered by the main circulation pump 39 to the low temperature heat collection device 2 in which the water is heated by solar energy to be turned into water-steam two-phase fluid. The water-steam two-phase fluid generated by the low temperature heat collection device 2 flows through the line 2-3. Then, the water-steam two-phase fluid is separated into saturated steam and saturated water by the steam-water separation device 3. The saturated steam is supplied to the high temperature heat storage device 51 through the line 3-51 and exchanges heat with the second heat storage medium inside the high temperature heat storage device 51 so that the saturated steam can be turned into superheated steam. The superheated steam flows through the line 51-C and the line C-5 sequentially to be supplied to the steam turbine 5. On the other hand, the saturated water separated by the steam-water separation device 3 flows through the line 3-46 to be reserved in the tank 46. That is, the saturated water separated by the steam-water separation device 3 merges with water supplied from the feedwater pump 1.

<Long-Time Heat Release Operation Mode>

As shown in FIG. 14, water is supplied by the feedwater pump 1 and preheated in the feedwater heater 45 by extracted steam from the steam turbine 5. Then, the preheated water flows through the line 45-A and the line A-50 sequentially to be supplied to the low temperature heat storage device 50. The water supplied to the low temperature heat storage device 50 exchanges heat with the first heat storage medium packed inside the low temperature heat storage device 50 so that the water can be turned into water-steam two-phase fluid. The water-steam two-phase fluid flows through the line 50-53. Then, the water-steam two-phase fluid is separated into saturated steam and saturated water by the sub steam-water separation device 53. The saturated water is returned to the water supply line by the sub circulation pump 37. The saturated steam flows through the line 53-51 to be supplied to the high temperature heat storage device 51. The saturated steam supplied to the high temperature heat storage device 51 exchanges heat with the second heat storage medium packed in the high temperature heat storage device 51 so that the saturated steam can be turned into superheated steam. The superheated steam flows through the line 51-C and the line C-5 sequentially to be supplied to the steam turbine 5.

In this manner, in the solar power system according to the sixth embodiment, the configuration can be simplified and the inlet pressure of the steam turbine 5 can be made substantially equivalent in all operation modes, i.e. the heat storage operation mode, the short-time heat release operation mode and the long-time heat release operation mode. Accordingly, there is substantially no difference in power generation efficiency among all the operation modes. Incidentally, the solar power system according to the sixth embodiment can perform both the long-time heat release operation and the short-time heat release operation to meet various needs.

Seventh Embodiment

Figure 15:
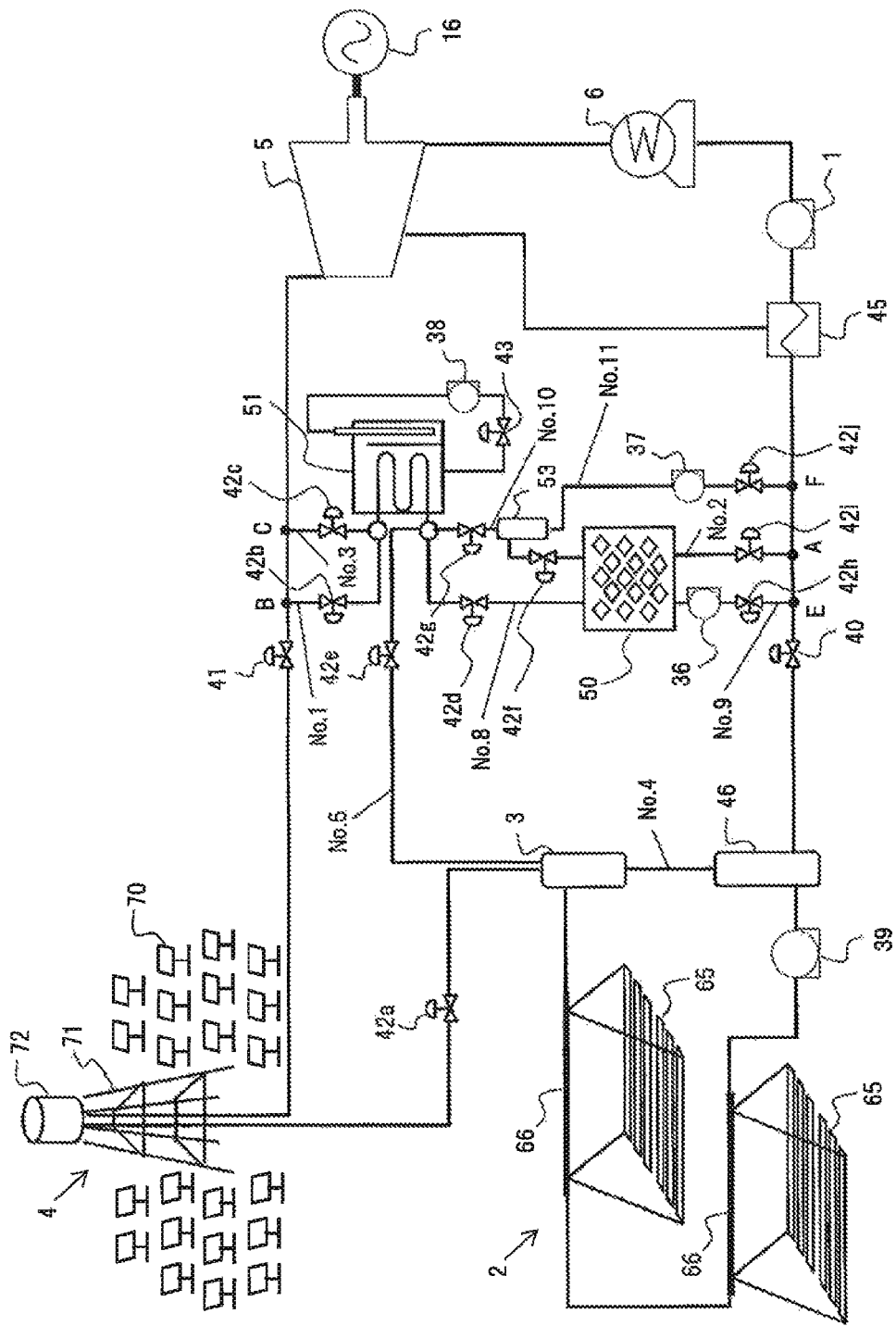
FIG. 15 A schematic view of the configuration of a solar power system according to a seventh embodiment of the invention.

FIG. 15 is a view of the configuration of a solar power system according to a seventh embodiment of the invention. The solar power system according to the seventh embodiment is characterized in that a Fresnel type light/heat collection device is used as the low temperature heat collection device 2 and a tower type light/heat collection device is used as the high temperature heat collection device 4 in comparison with the configuration of the solar power system according to the sixth embodiment. The remaining configuration of the solar power system according to the seventh embodiment is the same as that in the sixth embodiment. In addition, the tower type light/heat collection device and the Fresnel type light/heat collection device shown in FIG. 15 are the same in configuration as those devices used in the third embodiment. Therefore, description thereof will be omitted here. Also in the solar power system according to the seventh embodiment, operation can be performed in the heat storage operation mode, the short-time heat release operation mode and the long-time heat release operation mode in the same manner as in the sixth embodiment. Thus, the solar power system according to the seventh embodiment can obtain equivalent functions and effects to those in the sixth embodiment.

Figure 16:
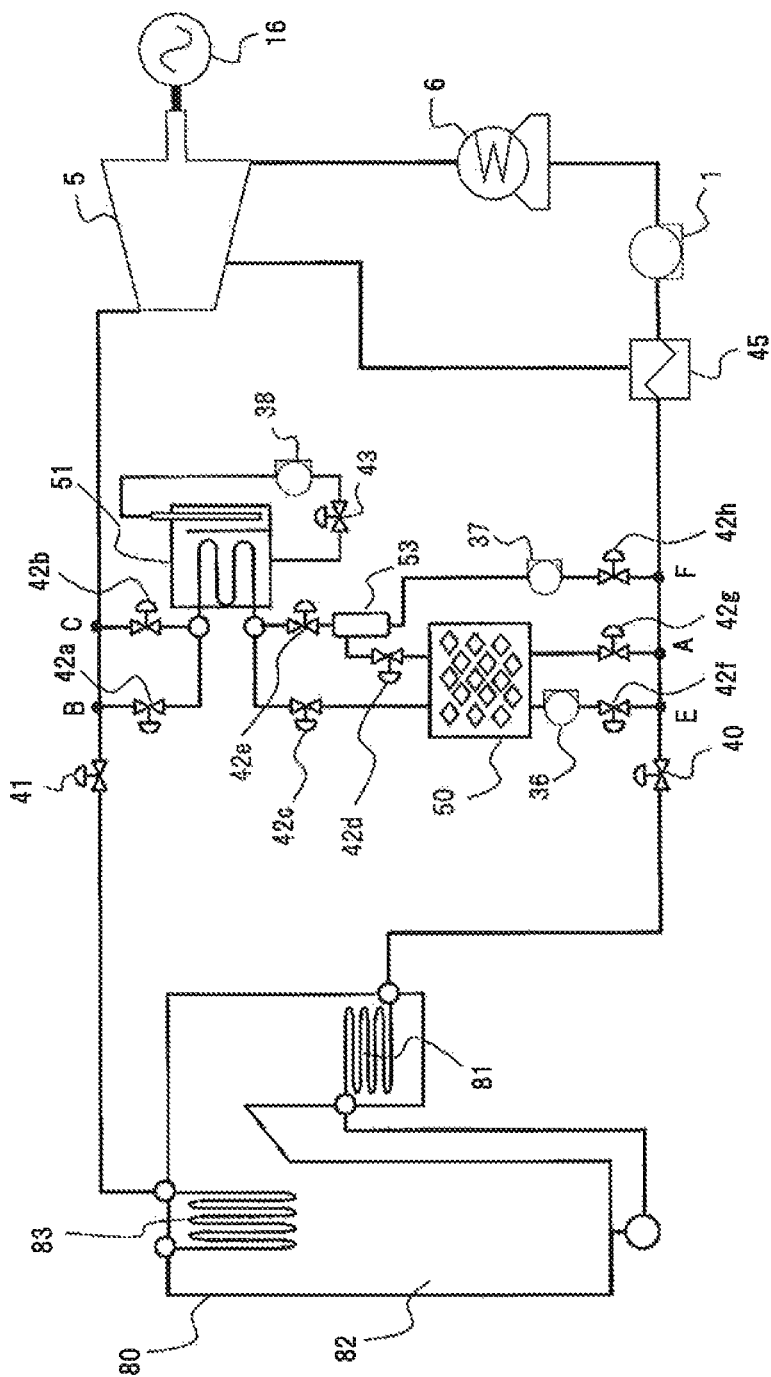
FIG. 16 A schematic view of a configuration in which a boiler is used in place of the heat storage device in the solar power system shown in FIG. 7.

Incidentally, it is a matter of course that the solar power system according to the invention may be incorporated into a thermal power plant using a boiler so as to be used as a combined solar thermal power plant. For example, the configuration of the solar power system according to the fourth embodiment may be arranged so that steam can be generated by a boiler 80 used in place of the low temperature heat collection device 2 and the high temperature heat collection device 4 as shown in FIG. 16. Incidentally, in FIG. 16, the reference numeral 80 designates the boiler; 81, a boiler coal economizer; 82, a boiler water wall; and 83, a boiler superheater. Also in the configuration, operation can be performed in the heat storage operation mode and the heat release operation mode in the same manner as in the fourth embodiment.

REFERENCE SIGNS LIST

1 . . . feedwater pump, 2 . . . low temperature heat collection device (heat collection apparatus), 3 . . . steam-water separation device, 4 . . . high temperature heat collection device (heat collection apparatus), 5 . . . steam turbine, 6 . . . gland condenser, 7 . . . steam extraction valve, 8 . . . heat storage device, 9 . . . water supply valve, 10 . . . water supply heat transfer pipe, 11 . . . superheated steam heat transfer pipe, 12 . . . arithmetic device (second control device), 13 . . . water supply valve, 14 . . . flowmeter, 15 . . . flow rate display panel, 16 . . . power generator, 17 . . . thermometer, 18 . . . arithmetic device, 19 . . . thermometer (temperature detector), 20 . . . arithmetic device (first control device), 21 . . . spray valve, 30 . . . flowmeter (flow rate detector), 31 . . . water level gauge (water level detector), 36 . . . pressure boosting pump, 37 . . . sub circulation pump, 38 . . . medium circulation pump, 39 . . . main circulation pump, 40 . . . water supply valve, 41 . . . main steam valve, 42a to 42j . . . changeover valves, 43 . . . flow rate regulation valve, 45 . . . feedwater heater, 46 . . . tank, 50 . . . low temperature heat storage device, 51 . . . high temperature heat storage device, 53 . . . sub steam-water separation device, 60 . . . deaerator, 80 . . . boiler, 81 . . . boiler coal economizer, 82 . . . boiler water wall, 83 . . . boiler superheater, A to F . . . branch points, No. 1 to No. 11 . . . first to eleventh lines

The invention claimed is:

1. A solar power system comprising: a heat collection apparatus which collects sunlight to heat water; a steam turbine; a power generator which generates electric power with motive power of the steam turbine; a superheated steam supply line which supplies the steam turbine with superheated steam generated by the heat collection apparatus; a water supply line which condenses the steam expelled from the steam turbine into water and supplies the condensed water to the heat collection apparatus; a heat storage device which has a heat storage medium; a first line which branches from the superheated steam supply line and which supplies the heat storage device with the superheated steam flowing through the superheated steam supply line; a second line which branches from the water supply line and which supplies the heat storage device with the water flowing through the water supply line; and a third line which supplies the steam turbine with superheated steam generated by the heat storage device; wherein:

the heat storage device stores the heat of the superheated steam which has flowed through the first line in the heat storage medium, and heats the water which has flowed through the second line with the heat storage medium to generate superheated steam;

the heat collection apparatus includes a low temperature heat collection device which heats water to generate steam and a high temperature heat collection device which further heats the steam heated by the low temperature heat collection device to generate superheated steam;

a steam-water separation device is provided between the low temperature heat collection device and the high temperature heat collection device;

a fourth line is provided to return water separated by the steam-water separation device to the water supply line;

a fifth line is provided to supply the steam-water separation device with the steam which has flowed from the first line into the heat storage device and whose heat has been released to the heat storage medium in the heat storage device;

the solar power system further comprises a temperature detector which detects the temperature of the superheated steam flowing through the first line; a spray valve provided in the first line which adjusts the temperature of the superheated steam flowing through the first line and flowing into the heat storage device by spraying water directly to the superheated steam; and a first control device which controls action of the spray valve; and the first control device adjusts a valve opening degree of the spray valve based on a detection signal of the temperature detector so that the temperature of the superheated steam flowing through the first line can be kept lower than a temperature which can cause deterioration of the heat storage medium.

2. A solar power system according to claim 1, further comprising:

a water supply valve which is provided in the water supply line and which adjusts the flow rate of the water supplied to the low temperature heat collection device; a steam extraction valve which is provided in the first line and which adjusts the flow rate of the superheated steam supplied to the heat storage device; a water level detector which detects the level of the water separated by the steam-water separation device; a flow rate detector which detects the flow rate of the water supplied to the low temperature heat collection device; and a second control device which controls action of the water supply valve and action of the steam extraction valve; wherein:

the second control device adjusts a valve opening degree of the water supply valve and a valve opening degree of the steam extraction valve based on a detection signal of the water level detector and a detection signal of the flow rate detector so that the temperature of the superheated steam flowing through the fifth line can be kept higher than a coagulation point of the heat storage medium.

* * * * *